US012613531B2

(12) United States Patent
Iwahori et al.

(10) Patent No.: US 12,613,531 B2
(45) Date of Patent: Apr. 28, 2026

(54) ABNORMALITY DETECTION DEVICE, DETECTION DEVICE, AND VEHICLE

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 18/597,374

(22) Filed: Mar. 6, 2024

(65) Prior Publication Data

US 2024/0329656 A1 Oct. 3, 2024

(30) Foreign Application Priority Data

| Mar. 29, 2023 | (JP) | ................................. | 2023-052883 |
| Mar. 29, 2023 | (JP) | ................................. | 2023-052887 |
| Sep. 12, 2023 | (JP) | ................................. | 2023-147456 |

(51) Int. Cl.

| *G05D 1/617* | (2024.01) |
| *G06V 20/52* | (2022.01) |
| *G06V 20/58* | (2022.01) |
| *G05D 107/70* | (2024.01) |
| *G05D 109/10* | (2024.01) |

(52) U.S. Cl.
CPC ............. *G05D 1/617* (2024.01); *G06V 20/52* (2022.01); *G05D 2107/70* (2024.01); *G05D 2109/10* (2024.01); *G06V 2201/07* (2022.01); *G06V 2201/08* (2022.01)

(58) Field of Classification Search
CPC ........ G05D 1/225; G05D 1/617; G05D 1/249;

G05D 1/6987; G05D 2107/70; G05D 2105/22; G05D 2109/10; G05D 2111/10; G06V 20/52; G06V 20/58; G06V 2201/07; G06V 2201/08; B62D 65/18
See application file for complete search history.

(56) References Cited

U.S. PATENT DOCUMENTS

| 2014/0142868 | A1* | 5/2014 | Bidaud | .............. | G01N 21/8803 |
| | | | | | 702/34 |
| 2017/0320529 | A1 | 11/2017 | Nordbruch | | |
| 2019/0101924 | A1* | 4/2019 | Styler | .................... | G06V 20/56 |
| 2020/0004259 | A1* | 1/2020 | Gulino | ................. | G05D 1/0221 |
| 2020/0247399 | A1 | 8/2020 | Tanahashi et al. | | |
| 2021/0132197 | A1* | 5/2021 | Wachter | ............... | G01S 7/4802 |
| 2021/0255622 | A1* | 8/2021 | Haynes | ............ | B60W 60/0027 |
| 2021/0304609 | A1* | 9/2021 | Nielsen | ................ | G08G 1/0133 |
| 2022/0035371 | A1* | 2/2022 | Chan | .................... | G05D 1/0088 |

FOREIGN PATENT DOCUMENTS

| JP | 2017-538619 A | 12/2017 |
| JP | 2019-77266 A | 5/2019 |

* cited by examiner

*Primary Examiner* — Calvin Cheung

(74) *Attorney, Agent, or Firm* — Sughrue Mion, PLLC

(57) ABSTRACT

An abnormality detection device includes: an abnormality detection unit that detects an abnormality by analyzing a result of detection of at least one of a target object on a track of a vehicle, a target object around the vehicle, and a target object installed in the vehicle, the vehicle being capable of running by unmanned driving, the result of detection being by a detection device that is capable of detecting the at least one target object; and an output unit that, when the abnormality is detected, outputs a signal that is different from a signal output when the abnormality is not detected.

19 Claims, 31 Drawing Sheets

Fig.3A

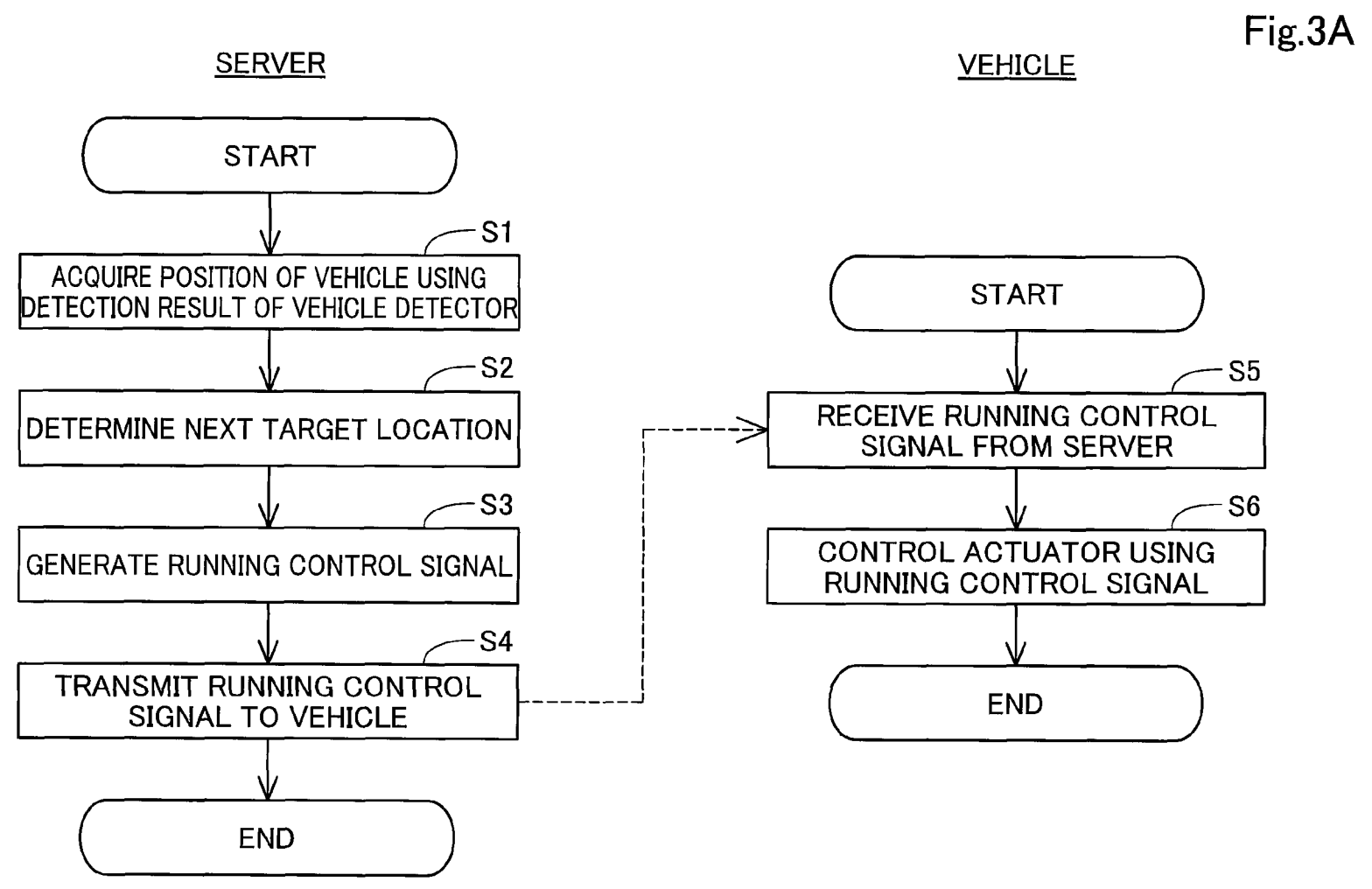

VEHICLE

START

RECEIVE RUNNING CONTROL SIGNAL FROM SERVER    S5

CONTROL ACTUATOR USING RUNNING CONTROL SIGNAL    S6

END

SERVER

START

ACQUIRE POSITION OF VEHICLE USING DETECTION RESULT OF VEHICLE DETECTOR    S1

DETERMINE NEXT TARGET LOCATION    S2

GENERATE RUNNING CONTROL SIGNAL    S3

TRANSMIT RUNNING CONTROL SIGNAL TO VEHICLE    S4

END

| FOREIGN MATTER | TYPE | AMOUNT OF FOREIGN MATTER | |
|---|---|---|---|
| | | EQUAL TO OR MORE THAN FIRST THRESHOLD | LESS THAN FIRST THRESHOLD |
| LIQUID | WATER | RUN TO REPAIR PROCESS | NO ABNORMALITY |
| | OIL | STOP VEHICLE | RUN TO REPAIR PROCESS |
| | COOLING WATER | STOP VEHICLE | RUN TO REPAIR PROCESS |
| | ... | ... | ... |

TM1

| FOREIGN MATTER | TYPE | VOLUME OR NUMBER OF FOREIGN MATTER | |
|---|---|---|---|
| | | EQUAL TO OR MORE THAN SECOND THRESHOLD | LESS THAN SECOND THRESHOLD |
| VEHICLE PART | NUT | RUN TO REPAIR PROCESS | NO ABNORMALITY |
| | BUMPER | STOP VEHICLE | RUN TO REPAIR PROCESS |
| | MIRROR | STOP VEHICLE | RUN TO REPAIR PROCESS |
| | ... | ... | ... |

| FOREIGN MATTER | TYPE | AMOUNT OF FOREIGN MATTER | |
| --- | --- | --- | --- |
| | | EQUAL TO OR MORE THAN THIRD THRESHOLD | LESS THAN THIRD THRESHOLD |
| LIQUID | WATER | STOP VEHICLE | NO ABNORMALITY |
| | OIL | STOP VEHICLE | RUN WHILE AVOIDING IT |
| | COOLING WATER | STOP VEHICLE | RUN WHILE AVOIDING IT |
| | ... | ... | ... |

TM2

| FOREIGN MATTER | TYPE | VOLUME OR NUMBER OF FOREIGN MATTER | |
| --- | --- | --- | --- |
| | | EQUAL TO OR MORE THAN FOURTH THRESHOLD | LESS THAN FOURTH THRESHOLD |
| VEHICLE PART | NUT | STOP VEHICLE | NO ABNORMALITY |
| | BUMPER | STOP VEHICLE | RUN WHILE AVOIDING IT |
| | MIRROR | STOP VEHICLE | RUN WHILE AVOIDING IT |
| | ... | ... | ... |

| TYPE OF CONTACT OBJECT | RUNNING METHOD | SUBSEQUENT RUNNING METHOD |
|---|---|---|
| STONE | NO CHANGE | NO CHANGE |
| VEHICLE PART | RUN TO REPAIR PROCESS | AVOID OCCURRENCE POSITION |
| ANIMAL | STOP VEHICLE | CHANGE TO ANOTHER ROUTE FOR DETOURING |
| VEHICLE | STOP VEHICLE | CHANGE TO ANOTHER ROUTE FOR DETOURING |
| ... | ... | ... |

| CONTACT POSITION | ABNORMALITY | RUNNING METHOD | SUBSEQUENT RUNNING METHOD |
|---|---|---|---|
| TIRE | SCRATCH | NO CHANGE | NO CHANGE |
| | CRACK | RUN TO REPAIR PROCESS | NO CHANGE |
| | ... | ... | ... |
| BUMPER | DENT | RUN TO REPAIR PROCESS | NO CHANGE |
| | FALLING | STOP VEHICLE | AVOID OCCURRENCE POSITION |
| | ... | ... | ... |
| WIND SHIELD | SCRATCH | RUN TO REPAIR PROCESS | NO CHANGE |
| | CRACK | STOP VEHICLE | AVOID OCCURRENCE POSITION |
| | ... | ... | ... |
| ... | | | |

ABNORMALITY DETECTION DEVICE, DETECTION DEVICE, AND VEHICLE

CROSS-REFERENCE TO RELATED APPLICATIONS

This application claims priority to Japanese Patent Application No. 2023-52883 filed on Mar. 29, 2023, Japanese Patent Application No. 2023-52887 filed on Mar. 29, 2023, and Japanese Patent Application No. 2023-147456 filed on Sep. 12, 2023, each of which is incorporated herein by reference in its entirety.

BACKGROUND

Field

The present disclosure relates to an abnormality detection device, a detection device, and a vehicle.

Related Art

For example, Japanese Patent Application No. 2017-538619 discloses a vehicle running method for a manufacturing system for manufacturing vehicles, in which a vehicle is made to run by remote control from the terminal end of the assembly line of the manufacturing system to the parking lot of the manufacturing system.

If any foreign matters are present in the track of the vehicle or around the vehicle, the running of the vehicle by unmanned driving may be interfered. Further, the quality of the vehicle as a product may decrease if the parts attached to the vehicle are not properly attached. Therefore, there is a need for technology to detect abnormalities in target objects on the track of the vehicle, target objects around the vehicle, target objects attached to the vehicle, and the like.

SUMMARY

The present disclosure may be realized by the following aspects.

(1) According to one aspect of the present disclosure, an abnormality detection device is provided. The abnormality detection device comprises: an abnormality detection unit that detects an abnormality by analyzing a result of detection of at least one of a target object on a track of a vehicle, a target object around the vehicle, and a target object attached to the vehicle, the vehicle being capable of running by unmanned driving, the result of detection being by a detection device that is capable of detecting the at least one target object; and an output unit that, when the abnormality is detected, outputs a signal that is different from a signal output when the abnormality is not detected.

The abnormality detection device according to this aspect is capable of detecting abnormalities caused by target objects on the track of the vehicle, target objects around the vehicle, and target objects attached to the vehicle, thereby suppressing or preventing inhibition of running of the vehicle by unmanned driving.

(2) In the abnormality detection device according to the above aspect, the detection device may further detect either an image of the vehicle or 3D point cloud data of the vehicle, in addition to the at least one target object.

The abnormality detection device according to this aspect is capable of detecting abnormalities caused by target objects on the track of the vehicle, target objects around the vehicle, and target objects attached to the vehicle without newly providing a dedicated detector, by using the detection device to detect target objects and also to detect either an image of the vehicle or 3D point cloud data of the vehicle.

(3) In the abnormality detection device according to the above aspect, the detection device may detect the target object on the track. The abnormality detection unit may detect a foreign matter on the track as the abnormality when an analysis result from the result of detection of the target object on the track by the detection device satisfies a predetermined condition for determining that the target object on the track is the foreign matter.

The abnormality detection device according to this aspect is capable of detecting abnormalities caused by target objects on the track of the vehicle, thereby suppressing or preventing inhibition of running of the vehicle by unmanned driving.

(4) The abnormality detection device according to the above aspect may further comprise a running method determination unit that determines a running method including at least one of whether or not the vehicle is capable of running and a change of a destination for which the vehicle is to be headed, using information regarding the detected foreign matter.

The abnormality detection device according to this aspect is capable of determining an appropriate running method for the vehicle according to the detected foreign matter.

(5) In the abnormality detection device according to the above aspect, the abnormality detection unit may analyze the result of detection by the detection device to further determine whether the detected foreign matter on the track is a liquid or not, and may further specify a type of the liquid when the foreign matter on the track is the liquid. The running method determination unit may determine the running method using the specified type of the liquid.

The abnormality detection device according to this aspect is capable of determining an appropriate running method for the vehicle according to the type of the liquid when the foreign matter is the liquid.

(6) In the abnormality detection device according to the above aspect, the abnormality detection unit may analyze the result of detection by the detection device to further determine whether the detected foreign matter on the track is a liquid or not, and may further determine whether or not an amount of the liquid is equal to or more than a predetermined first threshold when the foreign matter on the track is the liquid.

The running method determination unit may determine to stop the vehicle when the amount of the liquid is equal to or more than the predetermined first threshold, and may change the destination to a repair process when the amount of the liquid is less than the predetermined first threshold.

The abnormality detection device according to this aspect is capable of determining an appropriate running method for the vehicle according to the influence of the amount of the liquid on the running of the vehicle when the foreign matter is the liquid.

(7) In the abnormality detection device according to the above aspect, the abnormality detection unit may analyze the result of detection by the detection device to further determine whether the detected foreign matter on the track is a vehicle part of the vehicle or not, and may further specify a type of the vehicle part when the foreign matter on the track is determined to be the vehicle part. The running method determination unit may determine the running method using the specified type of the vehicle part.

The abnormality detection device according to this aspect is capable of determining an appropriate running method for the vehicle according to the type of vehicle part when the foreign matter is a vehicle part.

(8) The abnormality detection unit may analyze the result of detection by the detection device to further determine whether the detected foreign matter on the track is a vehicle part of the vehicle or not, and may further determine whether or not a volume or a number of the vehicle part is equal to or more than a predetermined second threshold when the foreign matter on the track is determined to be the vehicle part. The running method determination unit may determine to stop the vehicle when the volume or the number of the vehicle part is equal to or more than the predetermined second threshold, and may change the destination to a repair process when the volume or the number of the vehicle part is less than the predetermined second threshold.

The abnormality detection device according to this aspect is capable of determining an appropriate running method for the vehicle according to the influence of the volume or the number of the vehicle part on the running of the vehicle when the foreign matter is the vehicle part.

(9) In the abnormality detection device according to the above aspect, the running method determination unit may further determine a subsequent running method using information regarding the detected foreign matter on the track, the subsequent running method including at least one of whether or not a subsequent vehicle is capable of running, and a subsequent running route where the subsequent vehicle runs, the subsequent vehicle running after the foreign matter on the track is detected.

The abnormality detection device according to this aspect is capable of determining an appropriate running method for the subsequent vehicle according to the detected foreign matter.

(10) In the abnormality detection device according to the above aspect, the abnormality detection unit may analyze the result of detection by the detection device to further determine whether the detected foreign matter on the track is a liquid or not, and may further specify a type of the liquid when the foreign matter on the track is the liquid. The running method determination unit may determine the subsequent running method using the specified type of the liquid.

The abnormality detection device according to this aspect is capable of determining an appropriate running method for the subsequent vehicle according to the type of liquid, when the foreign matter is the liquid.

(11) In the abnormality detection device according to the above aspect, the abnormality detection unit may analyze the result of detection by the detection device to further determine whether the detected foreign matter on the track is a liquid or not, and may further determine whether or not an amount of the liquid is equal to or more than a predetermined third threshold when the foreign matter on the track is the liquid. The running method determination unit may determine to stop the subsequent vehicle when the amount of the liquid is equal to or more than the predetermined third threshold, and may change the subsequent running route to a subsequent running route where contact between the subsequent vehicle and the liquid is avoided when the amount of the liquid is less than the predetermined third threshold.

The abnormality detection device according to this aspect is capable of determining an appropriate running method for the subsequent vehicle according to the influence of the amount of the liquid on the running of the subsequent vehicle when the foreign matter is the liquid.

(12) In the abnormality detection device according to the above aspect, the abnormality detection unit may analyze the result of detection by the detection device to further determine whether the detected foreign matter on the track is a vehicle part or not, and may further specify a type of the vehicle part when the foreign matter on the track is determined to be the vehicle part. The running method determination unit may determine the subsequent running method using the specified type of the vehicle part.

The abnormality detection device according to this aspect is capable of determining an appropriate running method for the subsequent vehicle according to the type of the vehicle part, when the foreign matter is the vehicle part.

(13) In the abnormality detection device according to the above aspect, the abnormality detection unit may analyze the result of detection by the detection device to further determine whether the detected foreign matter on the track is a vehicle part or not, and may further determine whether or not a volume or a number of the vehicle part is equal to or more than a predetermined fourth threshold when the foreign matter on the track is determined to be the vehicle part. The running method determination unit may determine to stop the subsequent vehicle when the volume or the number of the vehicle part is equal to or more than the predetermined fourth threshold, and may change a running route of the subsequent vehicle to a subsequent running route where contact between the subsequent vehicle and the vehicle part is avoided when the volume or the number of the vehicle part is less than the predetermined fourth threshold.

The abnormality detection device according to this aspect is capable of determining an appropriate running method for the subsequent vehicle according to the influence of the volume or the number of the vehicle parts on the running of the subsequent vehicle when the foreign matter is the vehicle part.

(14) In the abnormality detection device according to the above aspect, the abnormality detection unit may analyze the result of detection by the detection device to further extract a detection position and a detection timing of the foreign matter on the track, and may determine whether or not the foreign matter on the track is an item having been installed in the vehicle using the extracted detection position and detection timing.

The abnormality detection device according to this aspect is capable of presuming whether or not the vehicle has a defect related to a foreign matter by determining whether or not the foreign matter is an item having been installed in the vehicle.

(15) In the abnormality detection device according to the above aspect, when the foreign matter on the track is determined to be an item installed in the vehicle, the running method determination unit may change the destination to a repair process.

The abnormality detection device according to this aspect is capable of allowing the vehicle to immediately run to the repair process.

(16) In the abnormality detection device according to the above aspect, the detection device may detect the target object around the vehicle. The abnormality detection unit may analyze a result of detection of the target object around the vehicle by the detection device, and, when a predetermined condition for determining that the target object around the vehicle is a contact object that has come in contact with the vehicle is satisfied, the abnormality detection unit may detect the contact object as the abnormality.

The abnormality detection device according to this aspect is capable of detecting abnormalities caused by target objects around the vehicle, thereby suppressing or preventing inhibition of running of the vehicle by unmanned driving.

(17) The abnormality detection device according to the above aspect may further comprise a running method determination unit that determines a running method including at least one of whether or not the vehicle is capable of running and a destination for which the vehicle is to be headed, using information regarding the detected contact object.

The abnormality detection device according to this aspect is capable of determining an appropriate running method for the vehicle according to the detected contact object.

(18) In the abnormality detection device according to the above aspect, the abnormality detection unit may analyze the result of detection by the detection device to further identify a type of the detected contact object. The running method determination unit may determine the running method using the identified type of the contact object.

The abnormality detection device according to this aspect is capable of determining an appropriate running method for the vehicle according to the type of the contact object.

(19) In the abnormality detection device according to the above aspect, the abnormality detection unit may analyze the result of detection by the detection device to further acquire a speed upon contact of the detected contact object with the vehicle.

The running method determination unit may determine the running method using the acquired speed of the contact object.

The abnormality detection device according to this aspect is capable of determining an appropriate running method for the vehicle according to the influence on the vehicle presumed from the speed of the contact object.

(20) In the abnormality detection device according to the above aspect, the abnormality detection unit may analyze the result of detection by the detection device to further acquire a volume of the detected contact object or a mass of the detected contact object. The running method determination unit may determine the running method using the acquired volume or mass.

The abnormality detection device according to this aspect is capable of determining an appropriate running method for the vehicle according to the influence on the vehicle presumed from the volume or the mass of the contact object.

(21) The abnormality detection device according to the above aspect may further comprise a vehicle abnormality detection unit that detects an abnormality of the vehicle caused by contact of the contact object with respect to the vehicle. The abnormality detection unit may specify a contact position of the contact object in the vehicle. The vehicle abnormality detection unit may analyze the specified contact position to detect the abnormality of the vehicle at the contact position.

The abnormality detection device according to this aspect is capable of detecting an abnormality of the vehicle caused by the contact object, in addition to the presence or absence of the contact object.

(22) The abnormality detection device according to the above aspect may further comprise a running method determination unit that determines a running method including at least one of whether or not the vehicle is capable of running and a destination for which the vehicle is to be headed using information regarding the detected abnormality of the vehicle.

The abnormality detection device according to this aspect is capable of determining an appropriate running method for the vehicle according to the abnormality that has occurred in the vehicle.

(23) In the abnormality detection device according to the above aspect, the running method determination unit may further determine a subsequent running method using information regarding the detected contact object, the subsequent running method including at least one of whether or not a subsequent vehicle is capable of running, and a subsequent running route where the subsequent vehicle runs, the subsequent vehicle running after the contact object is detected.

The abnormality detection device according to this aspect is capable of allowing the vehicle to properly run according to the contact object that may remain on the track of the vehicle.

(24) In the abnormality detection device according to the above aspect, when the contact object detection unit detects the contact object, the abnormality detection unit may give a notification to require removal of the contact object.

The abnormality detection device according to this aspect is capable of promptly removing the contact object, thereby suppressing change of the running route of the vehicle running after the contact object is detected to a running route different from the running route when the contact object is not detected.

(25) In the abnormality detection device according to the above aspect, the detection device may detect a target object attached to the vehicle. The abnormality detection unit may detect improper attachment of the target object to the vehicle as the abnormality when an analysis result does not satisfy a predetermined condition for determining that the target object attached to the vehicle is properly attached to the vehicle, the analysis result being by analyzing the result of detection of the target object attached to the vehicle by the detection device.

The abnormality detection device according to this aspect is capable of detecting an abnormality caused by the target object attached to the vehicle, thereby suppressing or preventing inhibition of running of the vehicle by unmanned driving.

(26) The abnormality detection device according to the above aspect may further comprise a running method determination unit that determines a running method including at least one of whether or not the vehicle is capable of running and a change of a destination for which the vehicle is to be headed using information regarding the detected target object that is not properly attached to the vehicle.

The abnormality detection device according to this aspect is capable of determining an appropriate running method for the vehicle according to the detected foreign matter.

The present disclosure may also be implemented in various aspects other than abnormality detection devices. For example, the present disclosure may also be implemented in the form of a detection device, a detection method, a vehicle, a remote control device, a system, a method for manufacturing a vehicle, a method for controlling a vehicle, a method for controlling a system, a method for controlling an abnormality detection device, a computer program, a non-transitory storage medium storing the computer program, and the like.

BRIEF DESCRIPTION OF THE DRAWINGS

FIG. 3A is a flowchart of a vehicle running method implemented by the server;

FIG. 3B is an explanatory view showing an overview of automatic driving control for a vehicle by remote control of a remote control unit;

FIG. 4 is an explanatory view of an example of a first correspondence table;

FIG. 5 is an explanatory view of an example of a second correspondence table;

FIG. 15 is an explanatory view of an example of a correspondence table;

FIG. 21 is a first explanatory view of a method for specifying the contact position of a contact object with respect to a vehicle;

FIG. 24 is an explanatory view of an overview of a correspondence table of a system including the abnormality detection device according to the fifth embodiment;

DETAILED DESCRIPTION

A. First Embodiment

Figure 1:
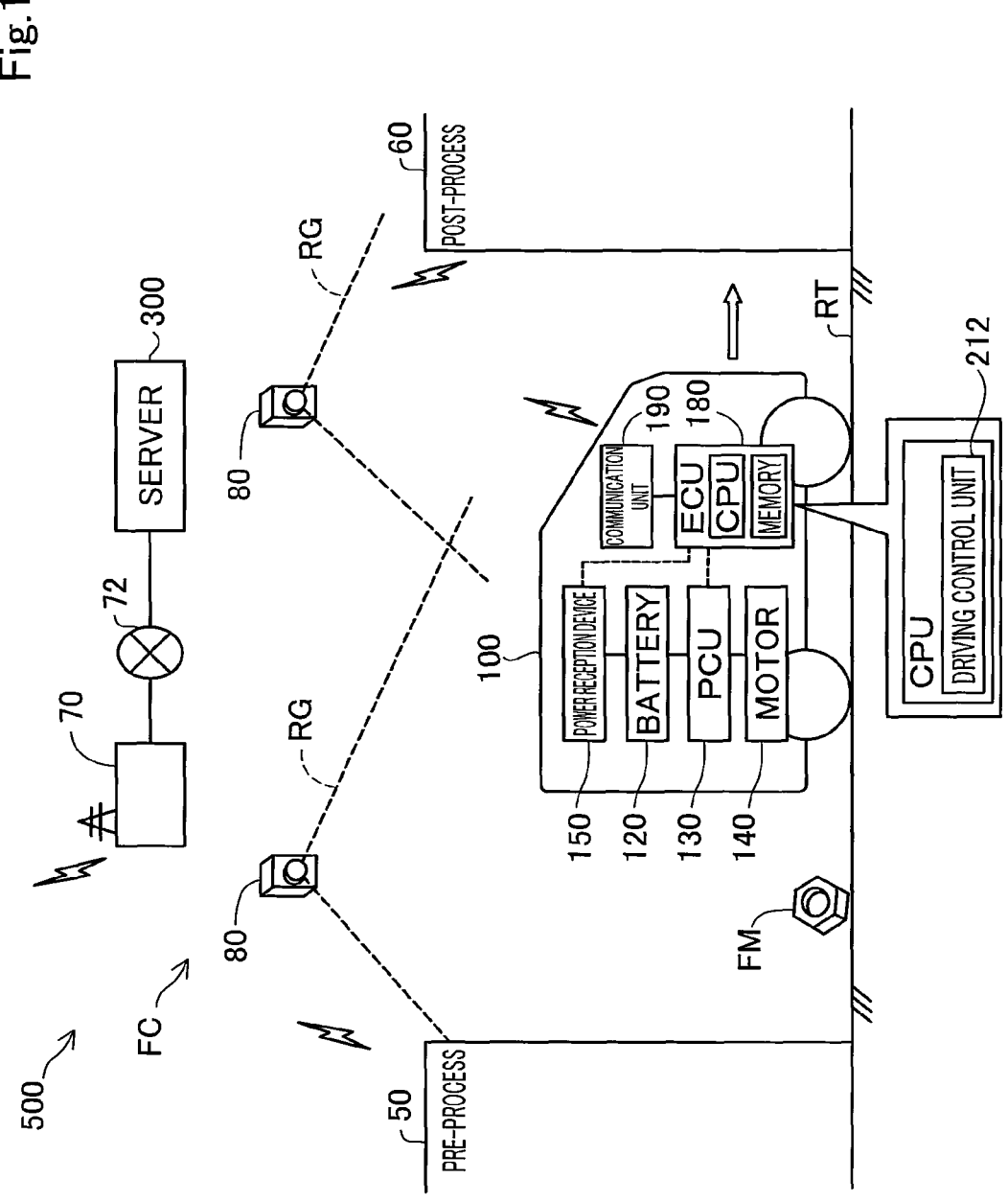
FIG. 1 is an explanatory view of a schematic structure of a system including an abnormality detection device of a first embodiment.

FIG. 1 is an explanatory view of a schematic structure of a system 500 including an abnormality detection device of the first embodiment. The system 500 causes a vehicle 100 to automatically run by remote control during the manufacturing process in a factory FC where the vehicle 100 is manufactured. The vehicle 100 is, for example, a passenger car, a truck, a bus, a construction vehicle, or the like. In the present embodiment, the vehicle 100 is an electric vehicle (BEV: Battery Electric Vehicle) that can run by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In this specification, the term "vehicle" is a general term for a finished product and a semi-finished product or in-process product in the halfway of manufacturing.

As shown in FIG. 1, the factory FC is equipped with a pre-process 50, a post-process 60, and a track RT for the vehicle 100. The track RT is a transport section for the vehicle 100 in the factory FC that connects the pre-process 50 and the post-process 60. The factory FC is not limited to a single building or those present at one property or one address. For example, each production step of the production process may be present across multiple buildings, multiple properties, multiple addresses, and the like. The "inside the factory FC" also includes a range from the point where the vehicle 100 is completed to the standby location where the completed vehicle 100 is loaded for shipment. The expression "the vehicle 100 runs inside the factory FC" includes the case where the vehicle 100 runs on a transport section, such as the track RT, between the processes that are present in multiple locations, and the case where the vehicle 100 runs within a process, and includes, for example, not only the case where the vehicle 100 runs on private roads but also the case where the vehicle 100 runs on public roads between factories so as to move between the factories present in multiple locations.

The pre-process 50 is, for example, an assembly process in which parts are assembled into a vehicle body. The post-process 60 is, for example, an inspection process for the vehicle 100. The vehicle 100 having left the pre-process 50 becomes an in-process product for the post-process 60, and runs on the track RT toward the destination, i.e., the post-process 60, by remote control. Upon arrival at the post-process 60, the vehicle 100 is entered into the post-process 60 upon receiving permission to enter. The vehicle 100 is completed as a product when the inspection process as the post-process 60 is completed, and runs toward a standby location in the factory FC to be ready for the shipment. Then, each vehicle 100 is shipped to the corresponding destination. The pre-process 50 and the post-process 60 are not limited to the assembly process and the inspection process, but may be various processes, on the premise that the vehicle 100 can run by remote control after being processed by the pre-process 50 and the post-process 60.

Each process in the factory FC, including the pre-process 50 and the post-process 60, is equipped with a step management device that manages manufacturing information of the vehicle 100. Examples of the "manufacturing information" includes the progress of processing by the process, the number of in-process products, the number of products being processed, the manufacturing time for each process, the start time and the completion time of processing by each process, vehicle identification information of the vehicle 100 present in each process, the scheduled daily production number, the target production time for the process to produce one vehicle 100, and the like. The target production time may also be referred to as a "takt time". The "vehicle identification information" refers to various types of information that enables individual identification of each vehicle 100. The vehicle identification information includes, for example, ID information given for each vehicle 100, specification information such as the vehicle type, color, and the shape of the vehicle 100, production management information such as the name of the process in progress performed on the vehicle 100, and the like. The vehicle identification information can be acquired, for example, from RF-ID (Radio Frequency-Identification) tags attached to the vehicle 100, or the like. In the case where a plurality of vehicles 100 are manufactured in groups, such as one lot at a time, the lot number or the like may be used as the vehicle identification information. Further, the vehicle identification information may be position information of the vehicle 100 in the factory FC, such as coordinates on the track RT or coordinates in the factory FC. The step management device in each step acquires a production status of the vehicle 100 in each step from cameras, sensors, and the like (not shown) provided in each step, and transmits the acquired production status to a server 300. The production status of each step may be transmitted to a production management device that supervises the production status of each step in the factory FC.

The vehicle 100 is equipped with a communication unit 190, a power reception device 150, a battery 120, a PCU 130, a motor 140, and an ECU (Electronic Control Unit) 180. The communication unit 190 is a wireless communication device mounted on the vehicle 100, such as a dongle. The communication unit 190 has a communication function that allows wireless communication and the like with devices outside the vehicle 100, such as the server 300 connected to a network 72, for example, via an access point 70 in the factory FC. This allows mutual communication between the vehicle 100 and the server 300. The communication unit 190 is capable of receiving control signals for remote control of the vehicle 100 from the server 300, and is also capable of transmitting information, such as SOC (State Of Charge) of the battery 120, the vehicle identification information, and the like, to the server 300. The communication unit 190 may perform communication using CAN (Controller Area Network) communication, which is used for, for example, control of the vehicle 100. The CAN communication is a communication standard that allows transmission and reception in multiple directions. The communication unit 190 may also use diagnosis communication. The diagnosis communication is a communication standard that allows one-to-one correspondence between requests and responses, and is used to diagnose malfunctions or the like.

The power reception device 150 converts AC power supplied from an external power feeder or the like into DC power using a rectifier, and supplies the resulting DC power to the battery 120 as a load. The battery 120 is a rechargeable secondary battery, such as a lithium-ion battery, a nickel-metal hydride battery, or the like. The battery 120 is a high-voltage battery of, for example, several hundreds volts, and stores electric power to be used for the running of the vehicle 100. The electric power supplied to the power reception device 150 from an external power feeder, and the regenerative power generated by the motor 140 are supplied to the battery 120 to charge the battery 120.

The motor 140 is, for example, an AC synchronous motor, and functions as an electric motor and a power generator. When the motor 140 functions as an electric motor, the motor 140 is driven by, as a power source, electric power stored in the battery 120. The output of the motor 140 is transmitted to the wheels via a reduction gear and axles. Upon lowering the speed of the vehicle 100, the motor 140 functions as a power generator using the rotation of the wheels, and generates regenerative power. The PCU (Power Control Unit) 130 is electrically connected between the motor 140 and the battery 120.

The PCU 130 has an inverter, a boosting converter, and a DC/DC converter. The inverter converts the DC power supplied from the battery 120 into AC power and supplies the resulting AC power to the motor 140. The inverter converts the regenerative power supplied from the motor 140 into DC power and supplies the resulting DC power to the battery 120. The boosting converter boosts the voltage of the battery 120 when the electric power stored in the battery 120 is supplied to the motor 140. The DC/DC converter steps down the voltage of the battery 120 when the electric power stored in the battery 120 is supplied to an auxiliary machine or the like.

The ECU 180 is mounted on the vehicle 100 and performs various types of control of the vehicle 100. The ECU 180 is equipped with a hard disk drive, an optical storage medium, a memory such as a semiconductor memory or the like, a CPU as a central processing unit, and the like. As the CPU executes various computer programs stored in the memory, various functions, such as a driving control unit 212, are implemented. The driving control unit 212 executes the driving control of the vehicle 100. The "driving control" includes, for example, adjustment of acceleration, speed, and steering angle. In remote driving control, the driving control unit 212 controls each actuator mounted on the vehicle 100 according to the control signals for remote control received from the server 300 via the communication unit 190. Further, the ECU 180 controls the PCU 130, thereby controlling the delivery and acceptance of the electric power between the battery 120 and the motor 140.

The system 500 is equipped with a vehicle detector and the server 300. The vehicle detector detects vehicle information that includes at least one of an image of the vehicle 100 and the position of the vehicle 100. The detected vehicle information is used for remote control by the system 500. The "vehicle information" may also include the running direction of the vehicle 100 or the orientation of the vehicle 100. The running direction of the vehicle 100 and the orientation of the vehicle 100 can be acquired, for example, by detecting the shape of the vehicle 100, the parts of the vehicle 100, and the like. However, it is also possible to acquire only the position of the vehicle 100 by the vehicle detector, and the running direction and the orientation of the vehicle 100 may be presumed by using changes in the vehicle 100 over time.

In the present embodiment, the vehicle detector also functions as a detection device that is further capable of detecting target objects on the track RT, in addition to the vehicle information. That is, in the present embodiment, the detection device that detects target objects on the track RT and the vehicle detector that detects the vehicle information are integrated into one unit. However, the detection device and the vehicle detector may be separated from each other. "Detecting target objects" may be detection of only the presence or absence of target object, or detection of characteristics of the target object, such as the size, shape, temperature, color, and the like, of the target object. The results of the detection of target objects are used to detect a foreign matter FM on the track RT, as shown in FIG. 1. The "foreign matter FM on the track RT" refers to, for example, a target object present at a location on or near the track RT that was not assumed to be present at the location in advance. By using the vehicle detector for remote control also for the detection of foreign matters, it is possible to detect the foreign matter FM without providing a dedicated detector therefor, thereby suppressing or preventing an increase in the number of parts of the system 500.

In the present embodiment, a camera 80 is used as the vehicle detector. The camera 80 is an external camera installed at a location different from the vehicle 100, and fixed to a position where images of the track RT and the vehicle 100 running on the track RT can be captured. The camera 80 acquires images of the vehicle 100 as the vehicle information. By performing image analysis, the images acquired by the camera 80 can be used to acquire various types of information, such as the position of the vehicle 100 relative to the track RT, the orientation of the vehicle 100, and the like, which can be used for remote control. By using the images captured by the camera 80, automatic running of the vehicle 100 can be performed by remote control without using a detector mounted on the vehicle 100, such as a camera, a millimeter wave radar, LiDAR (Light Detection And Ranging), and the like. However, it is possible to supplementally use a detector mounted on the vehicle 100 to help prevention of collisions during the remote control, or the like. The vehicle detector does not have to acquire images of the vehicle 100, as long as it is capable of acquiring the location of the vehicle 100. Various types of vehicle detector capable of detecting the position of the vehicle 100 may be used, including LiDAR, infrared sensors, laser sensors, ultrasonic sensors, millimeter wave radars, and the like. Further, the camera 80 is also capable of capturing images of target objects on the track RT. The images of target objects on the track RT captured by the camera 80 are used to detect foreign matters on the track RT.

The position of the vehicle 100 can be acquired, for example, by calculating the coordinates of the positioning point of the vehicle 100 in the image coordinate system using the outer shape of the vehicle 100 detected from the captured image of the camera 80, and converting the calculated coordinates to coordinates in the global coordinate system. The orientation of the vehicle 100 can be presumed based on the orientation of the motion vector of the vehicle 100 calculated from the positional changes of the feature points of the vehicle 100 between frames of the captured images using, for example, the optical flow method. The orientation of the vehicle 100 may also be calculated, for example, using the results of output of a yaw rate sensor or the like mounted on the vehicle 100.

The outer shape of the vehicle 100 in the captured image may be detected by inputting the captured image to a detection model using artificial intelligence, for example. The detection model is prepared in the system 500 or outside the system 500. The detection model is stored in advance in a storage device 320 of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

Figure 2:
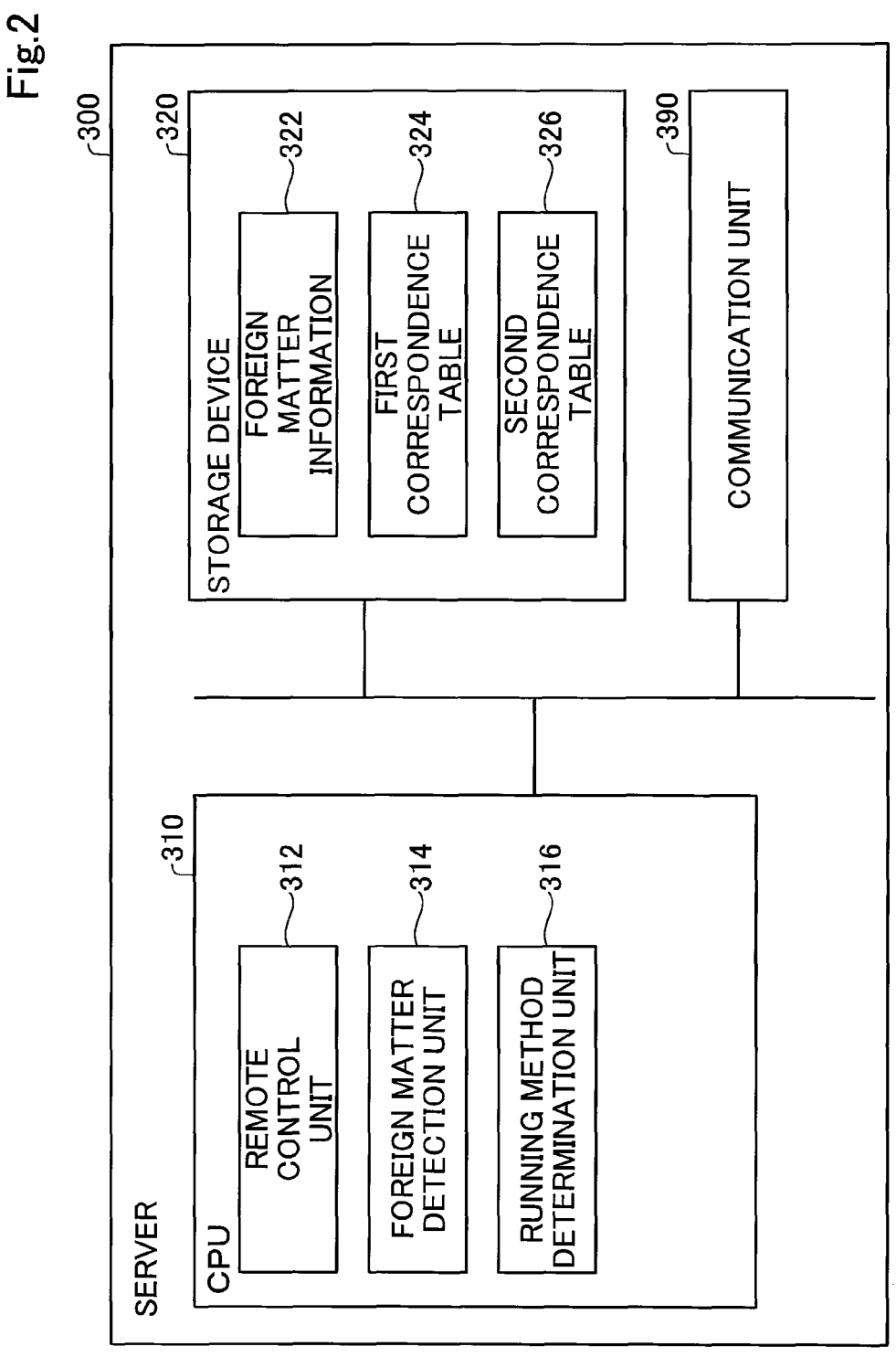
FIG. 2 is a block diagram of an internal functional structure of a server.

FIG. 2 is a block diagram of an internal functional structure of the server 300. In the present embodiment, the server 300 functions as an abnormality detection device that detects abnormalities by analyzing the results of detection of target objects by the camera 80. The server 300 is provided with a CPU 310 as the central processing unit, a storage device 320, and a communication unit 390, which are connected one another via an internal bus, interface circuitry, or the like. The communication unit 390 is a circuit for performing communication with external devices, such as the vehicle 100, the production management device, and the like, via the network 72.

The storage device 320 is, for example, RAM, ROM, hard disk drive (HDD), solid state drive (SSD), or the like. The storage device 320 stores, for example, foreign matter information 322, a first correspondence table 324, and a second correspondence table 326. The storage device 320 stores various programs to implement the functions provided by the present embodiment. When the computer program stored in the storage device 320 is executed by the CPU 310, the CPU 310 functions as a remote control unit 312, a foreign matter detection unit 314, a running method determination unit 316, and the like. However, some or all of these functions may be configured by hardware circuits.

The foreign matter detection unit 314 performs image analysis of images of target objects on the track RT captured by the camera 80, and, based on the result of the image analysis, if a predetermined condition for determining whether or not the target object on the track RT is a foreign matter is satisfied, the foreign matter detection unit 314 determines that the target object on the track RT is a foreign matter FM, and detects the foreign matter FM on the track RT as an abnormality. The foreign matter detection unit 314 is an embodiment of the abnormality detection unit. The foreign matter detection unit 314 is capable of identifying the type, shape, amount, volume, and the number of foreign matters FM, as well as, such as the location of the foreign matter FM on the track RT, based on the captured images of the camera 80 using known object recognition algorithms. The object recognition may be performed with machine learning models using various neural networks and the like, such as convolutional neural networks (CNN), recurrent neural networks (RNN), generative adversarial networks (GAN), variational autoencoder (VAE), and the like. The object recognition may be performed by methods other than machine learning models, such as pattern matching, or the like. The results of the analysis of captured images by the foreign matter detection unit 314 are stored in the storage device 320 as the foreign matter information 322. In the present embodiment, the foreign matter detection unit 314 is capable of presuming whether or not the foreign matter FM is an item having been installed in the vehicle 100 by means of image analysis of the captured images, and also by using the detection position of the foreign matter FM and the detection timing of the foreign matter FM.

The running method determination unit 316 determines the running method of the vehicle 100, including whether or not the vehicle 100 is capable of running and change in the destination for which the vehicle 100 is to be headed, using the information regarding the foreign matter FM detected by the foreign matter detection unit 314. The running method determination unit 316 is an embodiment of an "output unit" that outputs a signal to the vehicle 100 when an abnormality is detected, the signal being different from a signal output when no abnormality is detected. If, for example, it is assumed from the foreign matter FM that there may be an abnormality in the vehicle 100, the running method determination unit 316 outputs a control signal to the vehicle 100 to, for example, change the destination for which the vehicle 100 is headed to a destination where the abnormality of the vehicle 100 can be solved, such as a repair process, instead of the post-process 60. In the present embodiment, the running method determination unit 316 determines the running method of the vehicle 100 using the first correspondence table 324 stored in the storage device 320.

In the present embodiment, the running method determination unit 316 further determines a subsequent running method for the subsequent vehicle using the information regarding the detected foreign matter FM. The running method for the subsequent vehicle includes whether or not the subsequent vehicle is capable of running and the subsequent running route where the subsequent vehicle runs. In the present embodiment, the running method determination unit 316 determines the running method of the subsequent vehicle using the second correspondence table 326 stored in the storage device 320. The "subsequent vehicle" refers to a vehicle 100 that may run on the track RT on which a foreign matter FM is present, after the foreign matter FM is detected. The running method determination unit 316 determines whether or not the subsequent vehicle is capable of running, and, for example, in the case where the foreign matter FM prevents the running of the subsequent vehicle, the running method to avoid contact between the subsequent vehicle and the foreign matter FM. The running route on which the subsequent vehicle runs is also referred to as a "subsequent running route" and the running method for the subsequent vehicle is also referred to as a "subsequent running method".

The remote control unit 312 performs automatic running of the vehicle 100 in the factory FC by remote control using the vehicle information. More specifically, the remote control unit 312 acquires the vehicle information from the camera 80 via the communication unit 390, and presumes the position and the orientation of the vehicle 100 using the acquired vehicle information. The remote control unit 312 generates a control command for enabling automatic running of the vehicle 100 by remote control using the presumed position and orientation of the vehicle 100 and transmits the command to the vehicle 100. This control command is, for example, a command to make the vehicle 100 run according to a target route stored in the storage device 320. The control command can be generated as a command that includes a driving or braking force and a steering angle. When the vehicle 100 receives the request for remote control, the driving control unit 212 of the ECU 180 performs driving control, thereby enabling automatic running of the vehicle 100.

FIG. 3A is a flowchart of a running method of the vehicle 100 achieved by the server 300. The remote control unit 312 presumes the position and the orientation of the vehicle 100 (step S1). In the present embodiment, the position of the vehicle 100 includes X, Y, Z coordinates in the global coordinate system of the factory. The position of the camera 80 is adjusted in advance. The remote control unit 312 detects the location of the vehicle 100 from the vehicle information acquired from the camera 80, and acquires the location of the vehicle 100 in the factory from the detected location of the vehicle 100.

The remote control unit 312 determines the target location where the vehicle 100 is supposed to go next (step S2). In the present embodiment, the target location is expressed in the form of X, Y, Z coordinates in the global coordinate system of the factory. The storage device 320 of the server 300 stores in advance a reference route where the vehicle 100 is supposed to run. The route is represented by a node indicating the departure point, a node indicating the transit point, a node indicating the destination, and a link connecting these nodes. The remote control unit 312 determines the target location to which the vehicle 100 is supposed to go next using the location of the vehicle 100 and the reference route. The remote control unit 312 determines the target location on the reference route ahead of the current location of the vehicle 100.

The remote control unit 312 generates a running control signal to make the vehicle 100 run toward the determined target location (step S3). In the present embodiment, the running control signal includes the acceleration and the steering angle of the vehicle 100 as parameters. The remote control unit 312 calculates the running speed of the vehicle 100 based on the positional transition of the vehicle 100 and compares the calculated running speed with a predetermined target speed of the vehicle 100. When the running speed is lower than the target speed, the remote control unit 312 determines the acceleration so that the vehicle 100 increases its speed, and when the running speed is higher than the target speed, the remote control unit 312 determines the acceleration so that the vehicle 100 decreases its speed. When the vehicle 100 is located on the reference route, the remote control unit 312 determines the steering angle so that the vehicle 100 does not deviate from the reference route. When the vehicle 100 is not located on the reference route, in other words, when the vehicle 100 deviates from the reference route, the remote control unit 312 determines the steering angle so that the vehicle 100 returns on the reference route. In other embodiments, the running control signal may include the speed of the vehicle 100 as a parameter instead of or in addition to the acceleration of the vehicle 100.

The remote control unit 312 transmits the generated running control signal to the vehicle 100 (step S4). The remote control unit 312 repeats the acquisition of the location of the vehicle 100, the determination of the target location, the generation of the running control signal, the transmission of the running control signal, and the like, in a predetermined cycle.

The driving control unit 212 of the vehicle 100 receives the running control signal from the remote control unit 312 (step S5), and controls the actuators using the received running control signal, thereby allowing the vehicle 100 to run at the acceleration and the steering angle indicated by the running control signal (step S6). The driving control unit 212 repeats the reception of the running control signal and the control of the actuators in a predetermined cycle. As described above, the vehicle 100 can be moved without using transport equipment, such as a crane, a conveyor, or the like, by making the vehicle 100 run by remote control.

Figure 3B:
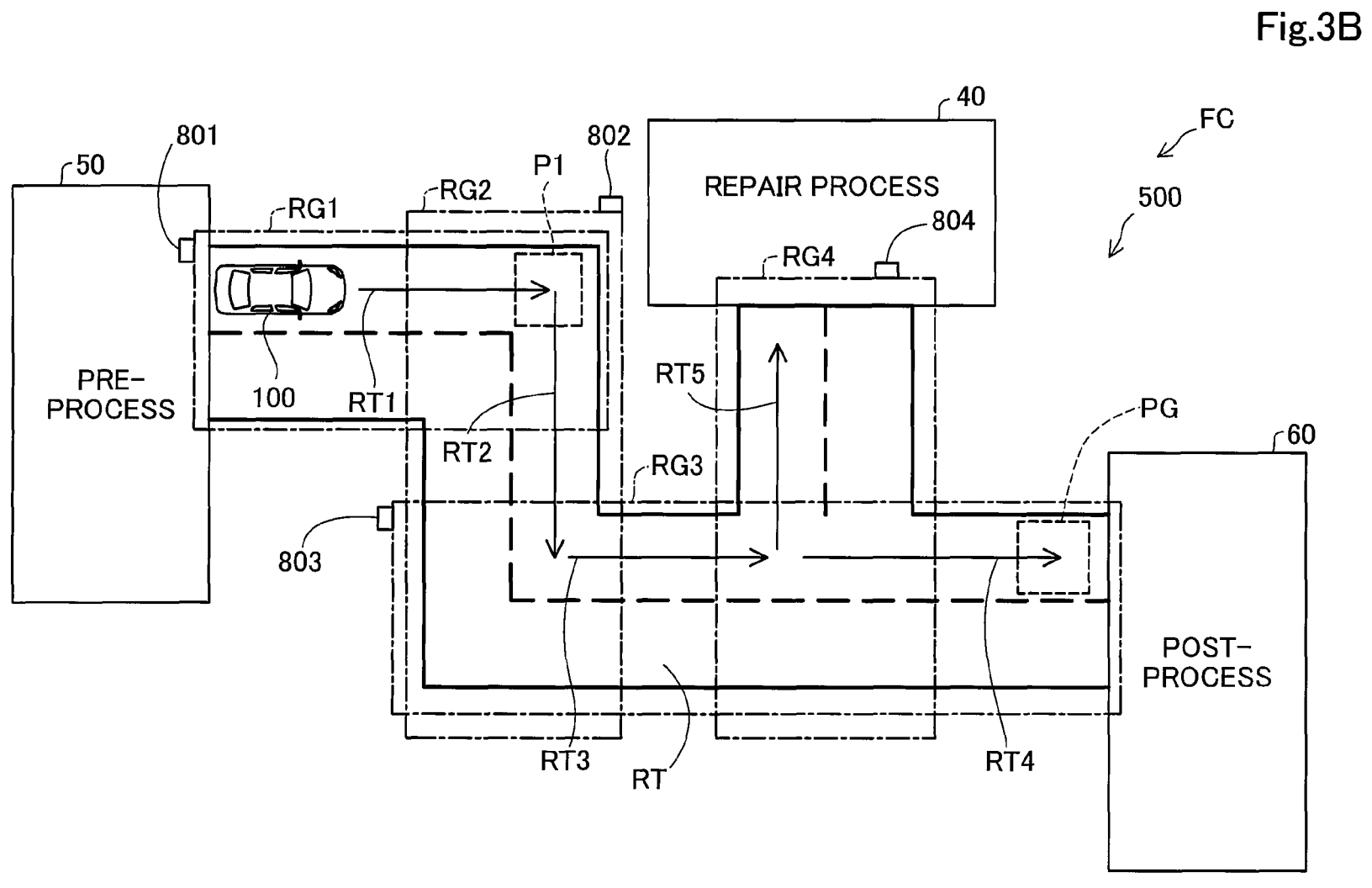

FIG. 3B is an explanatory view showing an overview of automatic driving control for the vehicle 100 by remote control of the remote control unit 312. In the example in FIG. 3B, the track RT has two lanes; however, the number of lanes on the track RT may be singular or any number equal to or more than three. The track RT includes a first track RT1, a second track RT2, a third track RT3, a fourth track RT4, and a repair track RT5, which are continuous with each other. The first track RT1 and the second track RT2 are connected to each other via a right-angle curve. The repair track RT5 leading to a repair process 40 is connected between the third track RT3 and the fourth track RT4. The remote control unit 312 normally makes the vehicle 100 run on the first track RT1, the second track RT2, the third track RT3, and the fourth track RT4 in that order, to a placement position PG where the vehicle is entered into the post-process 60.

The camera 80 acquires a bird's-eye view image of the vehicle 100 on the track RT, as shown in FIG. 3B. The number of the cameras 80 is set to the number with which the image of the entire track RT can be captured, in consideration of, for example, the angle of view of the camera 80. In the example in FIG. 3B, the camera 80 includes a camera 801 capable of capturing an image of a range RG1 including the entire first track RT1, a camera 802 capable of capturing an image of a range RG2 including the entire second track RT2, a camera 803 capable of capturing an image of a range RG3 including the entire third and fourth tracks RT3 and RT4, and a camera 804 capable of capturing an image of a range RG4 including the entire repair track RT5. The camera 80 is not limited to capturing an image from above the vehicle 100 and may acquire an image from any position, such as from the front, behind, or the side of the vehicle 100. Further, the cameras acquiring these images may be arbitrarily combined.

The track RT has a predetermined target route on which the vehicle 100 is supposed to run in normal conditions. The remote control unit 312 causes the ECU 180 to perform driving control of the vehicle 100 while analyzing the images of the track RT and the vehicle 100 acquired by the camera 80 at predetermined time intervals. The remote control unit 312 successively adjusts the position of the vehicle 100 relative to the target route, thereby allowing the vehicle 100 to run along the target route. For the remote control, the entire image of the vehicle 100 may be used, or an image of a part of the vehicle 100, such as an alignment mark provided in the vehicle 100, may be used.

At the connection position of each track, as in a position P1 in FIG. 3B, the angles of view of the cameras 80 corresponding to the tracks to be connected are configured to overlap each other. In the case of the position P1, the angle of view of the camera 801 corresponding to the first track RT1 and the angle of view of the camera 802 corresponding to the second track RT2 overlap each other. The vehicle 100 having left the pre-process 50 runs to the position P1 by remote control using captured images of the camera 801. Upon reaching the position P1, the driving is switched to remote control using captured images acquired by the camera 802 instead of those acquired by the camera 801, and the vehicle 100 runs on the second track RT2. Similarly, the captured images acquired by the camera 803 are used for the running on the third and fourth tracks RT3 and RT4, and the captured images acquired by the camera 804 are used for the running on the repair track RT5. In this way, the remote control unit 312 performs remote control of the vehicle 100 while suitably switching the captured images to be analyzed for each range of the track RT. The remote control unit 312 is capable of, by remote control, causing the vehicle 100 to run to the repair track RT5 to allow the vehicle 100 to enter the repair process 40.

FIG. 4 is an explanatory view of an example of the first correspondence table 324. The first correspondence table 324 defines the running method of the vehicle 100 corresponding to the foreign matter information 322. FIG. 4 schematically shows a first correspondence table TL1 in the case where the foreign matter FM is determined to be a "liquid" and a first correspondence table TM1 in the case where the foreign matter FM is determined to be a "vehicle part". Specifically, the first correspondence table TL1 defines the running method of the vehicle 100 according to the type of the liquid and as to whether the amount of the liquid is high or low. Whether the amount of the liquid is high or low is determined, for example, by determining whether the amount is equal to or more than a first threshold or less than the first threshold. The first threshold can be set using, for example, the correspondence between the amount of the detected liquid and the degree of the abnormality that may be caused by the amount of the liquid in the vehicle 100. In the case of FIG. 4, the degree of abnormality that may be caused in the vehicle 100 is set low for "water" and "nut" and set high for "oil", "cooling water", "bumper", and "mirror". For convenience of explanation, FIG. 4 shows an example in which the first threshold is set uniformly for the types of the liquid; however, different thresholds may be set for the respective types of the liquid, or multiple thresholds may be used for the respective types of the liquid.

As shown in FIG. 4, in the case where the foreign matter FM is determined to be, for example, "oil" or "cooling water" by the foreign matter detection unit 314, the running method determination unit 316 refers to the first correspondence table TL1, and stops the vehicle 100 when the detected amount of oil, etc. is equal to or more than the first threshold, or changes the destination to cause the vehicle 100 to run to the repair process 40 when the detected amount of oil, etc. is less than the first threshold. Further, in the case where the foreign matter FM is determined to be "water", the running method determination unit 316 causes the vehicle 100 to run to the repair process 40 when the detected amount of water is equal to or more than the first threshold. The running method determination unit 316 determines that there is no abnormality and causes the vehicle 100 to run normally when the detected amount of water is less than the first threshold. In the present embodiment, when it is specified that the vehicle 100 is the cause of the detected oil, etc. by a method of specifying the position where the foreign matter FM is detected, which is described later, the running method determination unit 316 stops the vehicle 100 or causes the vehicle 100 to run to the repair process 40. However, if it can be presumed that the cause of the foreign matter is the vehicle 100 which is currently running, at the time point when the foreign matter is detected, such as the case where a foreign matter such as oil is removed by workers, etc. immediately after the detection, the running method determination unit 316 may stop the vehicle 100 or cause the vehicle 100 to run to the repair process 40 without specifying whether or not the cause is the vehicle 100.

When the foreign matter FM is determined to be a "bumper" or "mirror", the running method determination unit 316 refers to the first correspondence table TM1, and stops the vehicle 100 if the number of detected bumpers, etc. is equal to or more than a second threshold, or determines the running method so that the destination for which the vehicle 100 is to be headed is changed to the repair process 40 when the number of detected bumpers, etc. is less than the second threshold. In the case where the foreign matter FM is determined to be a "nut", the running method determination unit 316 causes the vehicle 100 to run to the repair process 40 when the number of nuts is equal to or more than the second threshold, or determines that there is no abnormality and causes the vehicle 100 to run normally when the detected number of nuts is less than the second threshold. When a vehicle part is detected, a notification may be given to prompt an inspection to confirm a shortage of vehicle parts in the vehicle 100, regardless of the number of parts.

FIG. 5 is an explanatory view of an example of the second correspondence table 326. The second correspondence table 326 defines the running method of the subsequent vehicle corresponding to the foreign matter information 322. FIG. 5 schematically shows a second correspondence table TL2 in the case where the foreign matter FM is determined to be a "liquid" and a second correspondence table TM2 in the case where the foreign matter FM is determined to be a "vehicle part". Specifically, the second correspondence table TL2 defines the running method of the subsequent vehicle according to the type of the liquid and as to whether the amount of the liquid is high or low. Whether the amount of the liquid is high or low is determined depending on whether the amount is equal to or more than a third threshold, or less than the third threshold. The third threshold can be set by the same method as that for the first threshold.

As shown in FIG. 5, in the case where the foreign matter FM is determined to be, for example, "oil" or "cooling water" by the foreign matter detection unit 314, the running method determination unit 316 refers to the second correspondence table TL2, and stops the subsequent vehicle when the detected amount of oil, etc. is equal to or more than the third threshold, or determines the subsequent running method so that the subsequent vehicle runs on the subsequent running route in which the subsequent vehicle can run while avoiding the oil, etc. when the detected amount of oil, etc. is less than the third threshold. In the case where the foreign matter FM is determined to be "water", the running method determination unit 316 stops the subsequent vehicle when the amount of water is equal to or more than the third threshold, or determines that there is no abnormality and causes the subsequent vehicle to run normally when the amount of water is less than the third threshold.

In the case where the foreign matter FM is determined to be a "bumper" or "mirror", the running method determination unit 316 refers to the second correspondence table TM2, and stops the subsequent vehicle when the number of detected bumpers, etc. is equal to or more than a fourth threshold, or determines the subsequent running method so that the subsequent vehicle can run while avoiding the bumper, etc. when the number of detected bumpers, etc. is less than the fourth threshold. In the case where the foreign matter FM is determined to be a "nut", the running method determination unit 316 stops the subsequent vehicle when the number of nuts is equal to or more than the fourth threshold, or determines that there is no abnormality and causes the subsequent vehicle to run normally when the number of nuts is less than the fourth threshold.

Figure 6:
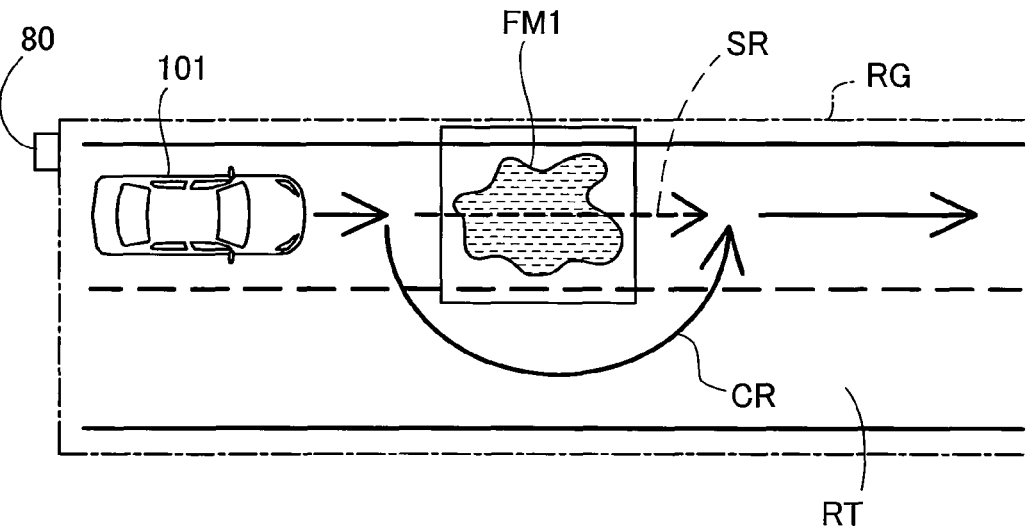
FIG. 6 is an explanatory view of a state in which a subsequent vehicle runs while avoiding oil as an example of a foreign matter.

FIG. 6 is an explanatory view of a state in which a subsequent vehicle 101 runs while avoiding oil FM1. The oil FM1 is an example of the foreign matter FM. In the example shown in FIG. 6, the type of the foreign matter FM is specified as the oil FM1 based on the color, etc. of the foreign matter FM by image analysis by the foreign matter detection unit 314, and the amount of the oil FM1 is also acquired. In the example of FIG. 6, the amount of the oil FM1 is determined to be less than the third threshold. The running method determination unit 316 refers to the second correspondence table TL2, and determines the subsequent running method so that the subsequent vehicle runs on the subsequent running route while avoiding the oil FM1. The running method determination unit 316 changes the subsequent running route from a normal route SR shown in FIG. 6 to an avoidance route CR in which the subsequent vehicle runs while avoiding the oil FM1. As a result, the remote control unit 312 causes the subsequent vehicle 101 to run according to the avoidance route CR.

Figure 7:
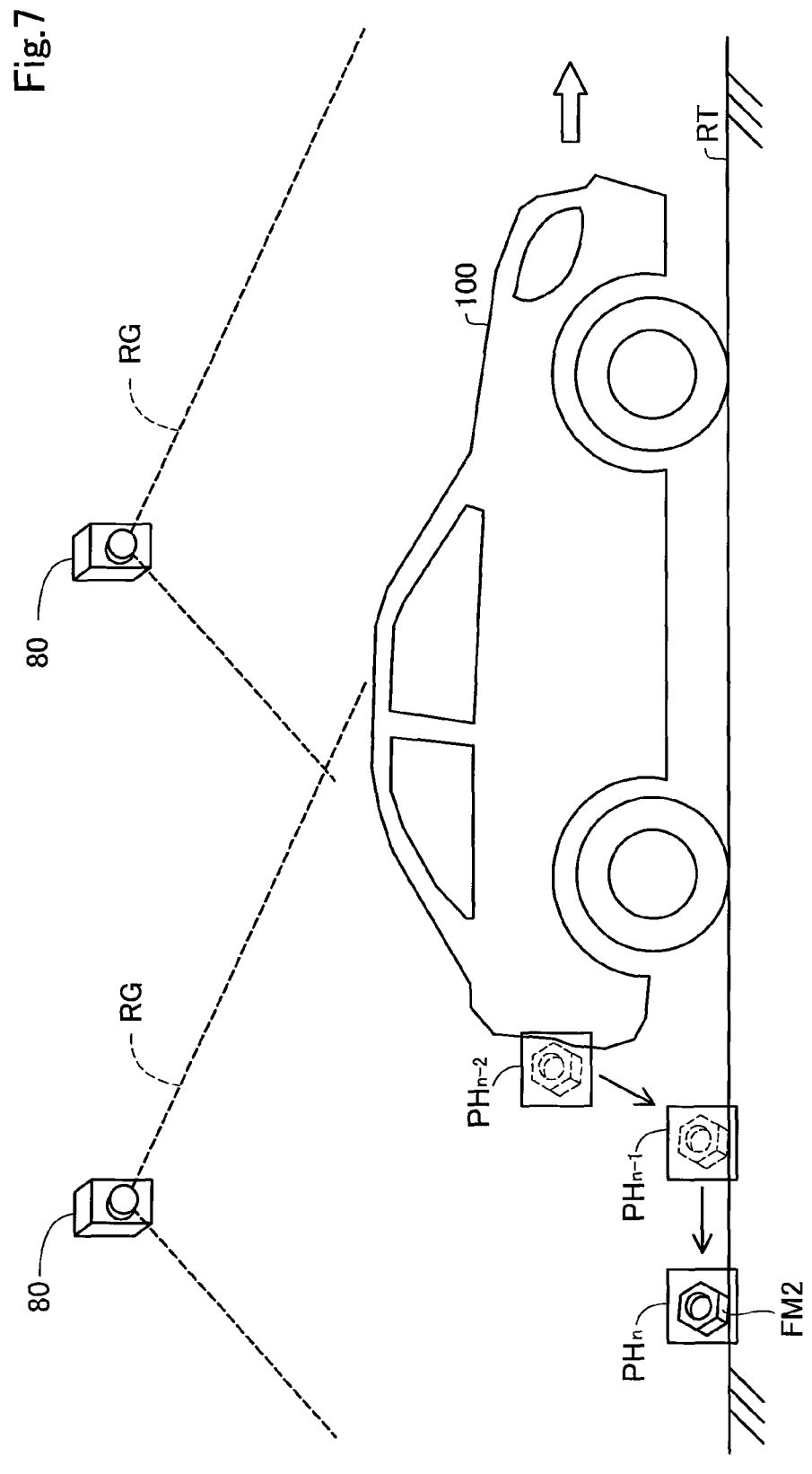
FIG. 7 is an explanatory view of a method for specifying whether or not a foreign matter is an item installed in the vehicle.

FIG. 7 is an explanatory view of a method for specifying whether or not the foreign matter FM is an item having been installed in the vehicle 100. The foreign matter detection unit 314 determines whether or not the vehicle 100 is the cause of the occurrence of the foreign matter FM, i.e., whether or not the foreign matter FM is an item having been installed in the vehicle 100, using the detection position of the extracted foreign matter FM and the detection timing thereof. For example, as shown in FIG. 7, the foreign matter detection unit 314 detects a foreign matter FM2 from an image PHn captured at a predetermined time point. The image PHn is one of the images captured by the camera 80. Next, the foreign matter detection unit 314 presumes the detection timing and the detection position of the foreign matter FM2. For example, the foreign matter detection unit 314 analyzes an image PHn−1, which is one frame before the image PHn, an image PHn−2, which is one more frame before the image PHn, and images earlier than these images (not shown). Among these images, the foreign matter detection unit 314 specifies the timing when the image PHn-2 is captured as the detection timing of the foreign matter FM2. In the image PHn−2, the foreign matter FM2 has been first recognized. Next, the foreign matter detection unit 314 determines whether or not the detection position of the foreign matter FM2 in the image PHn−2 at the detection timing is near the vehicle 100. Whether or not the detection position of the foreign matter FM2 is near the vehicle 100 can be determined according to whether the distance between the vehicle 100 and the foreign matter FM2 on the image is equal to or more than a predetermined threshold or less than the predetermined threshold.

The foreign matter detection unit 314 determines, for example, that the foreign matter FM2 is an item having been installed in the vehicle 100 when the position of the foreign matter FM2 at the detection timing of the foreign matter FM2 is within a predetermined distance from the vehicle 100. The "item having been installed in the vehicle 100" includes vehicle parts used for the vehicle 100, as well as fluids provided in the vehicle 100, such as oil and cooling water. In the case where the foreign matter FM2 is determined to be an item having been installed in the vehicle 100, it can be presumed that the vehicle 100 has a defect related to the foreign matter FM2.

Figure 8:
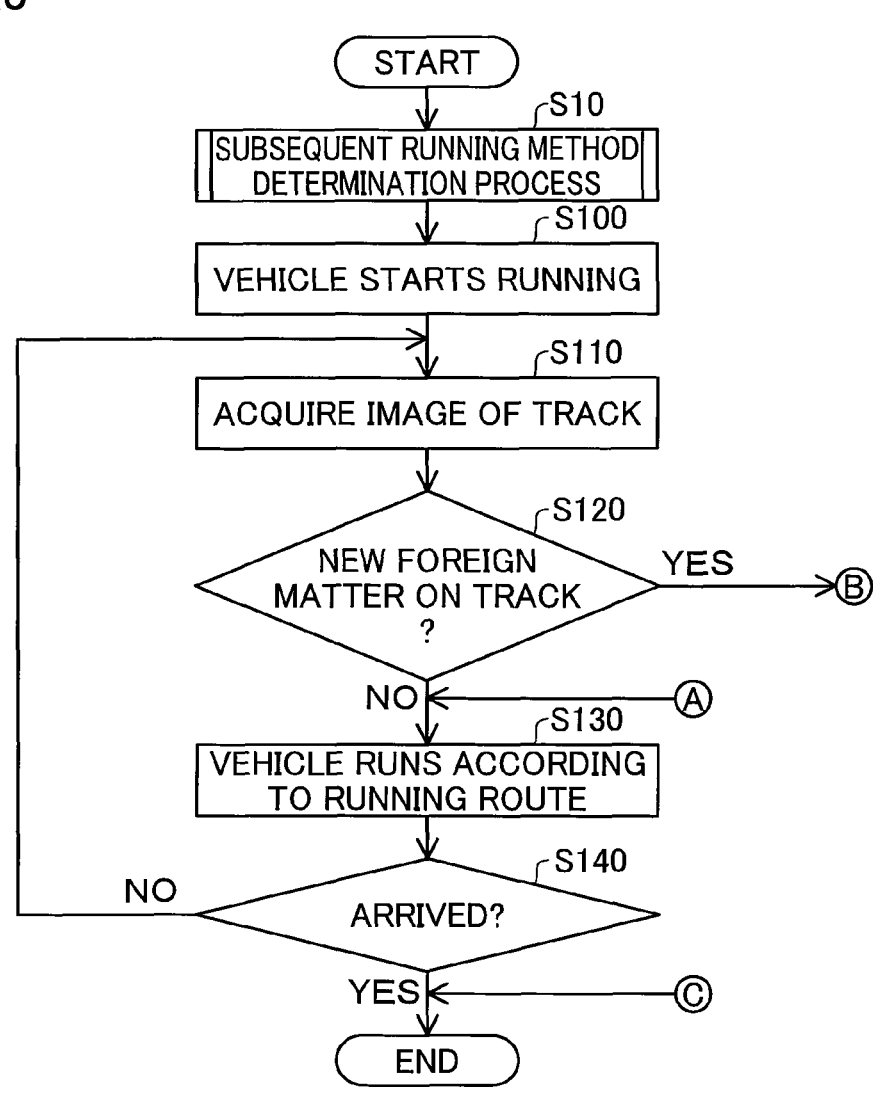
FIG. 8 is a first flowchart of a manufacturing method of a vehicle according to the first embodiment.
Figure 9:
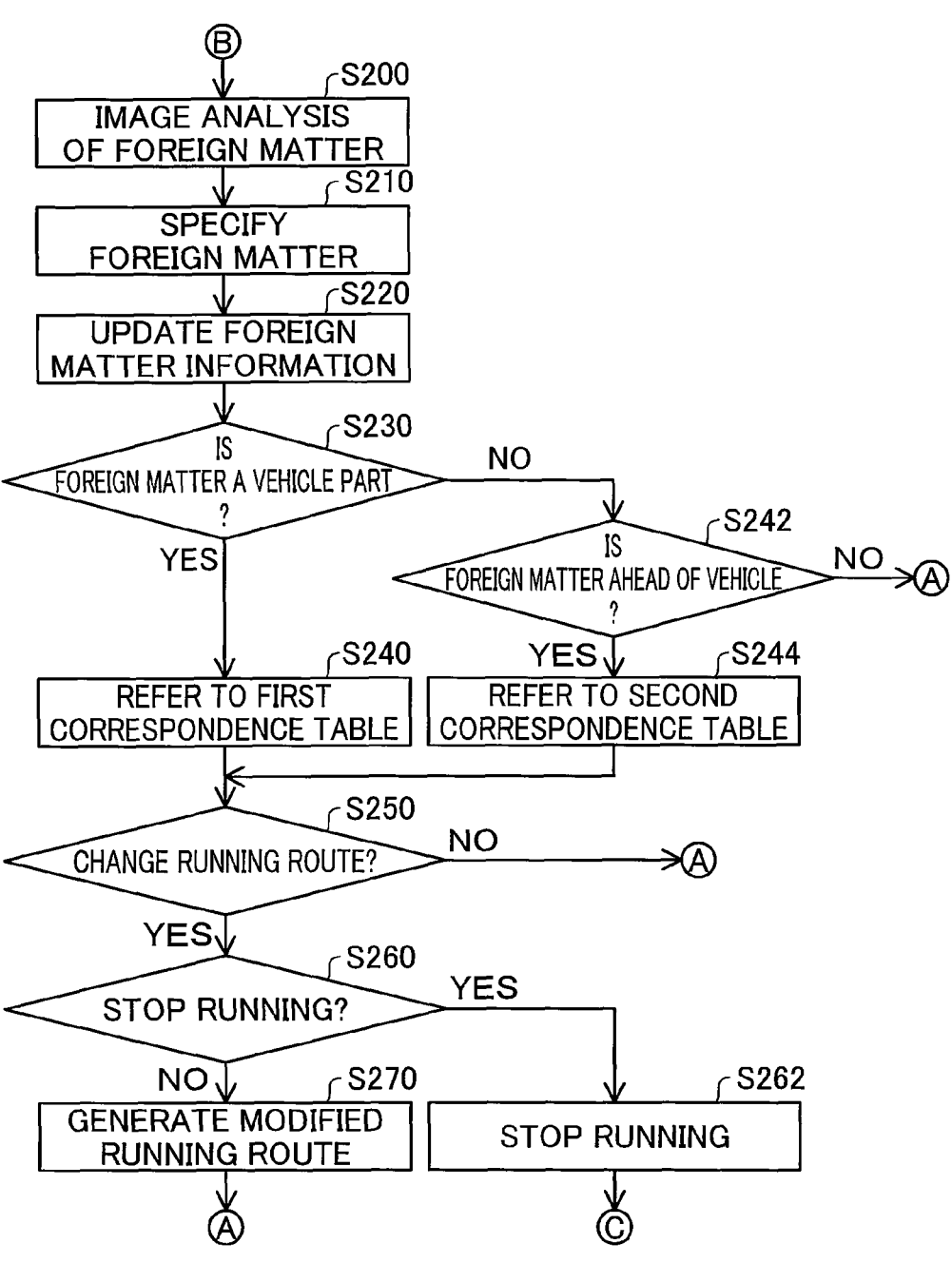
FIG. 9 is a second flowchart of a manufacturing method of a vehicle according to the first embodiment.

FIG. 8 is a first flowchart of a manufacturing method of the vehicle 100 according to the first embodiment. FIG. 9 is a second flowchart of the manufacturing method of the vehicle 100 according to the first embodiment. This flow is initiated, for example, when the running method determination unit 316 receives a notification of the completion of the process of the pre-process 50 from the step management device, the production management device, or the like, of the pre-process 50.

In the step S10, the running method determination unit 316 performs a subsequent running method determination process. For example, in the case where the foreign matter FM has already been detected on the track RT at the time point when the vehicle 100 starts running on the track RT, the running method determination unit 316 determines a subsequent running method of the vehicle 100, which is a subsequent vehicle.

Figure 10:
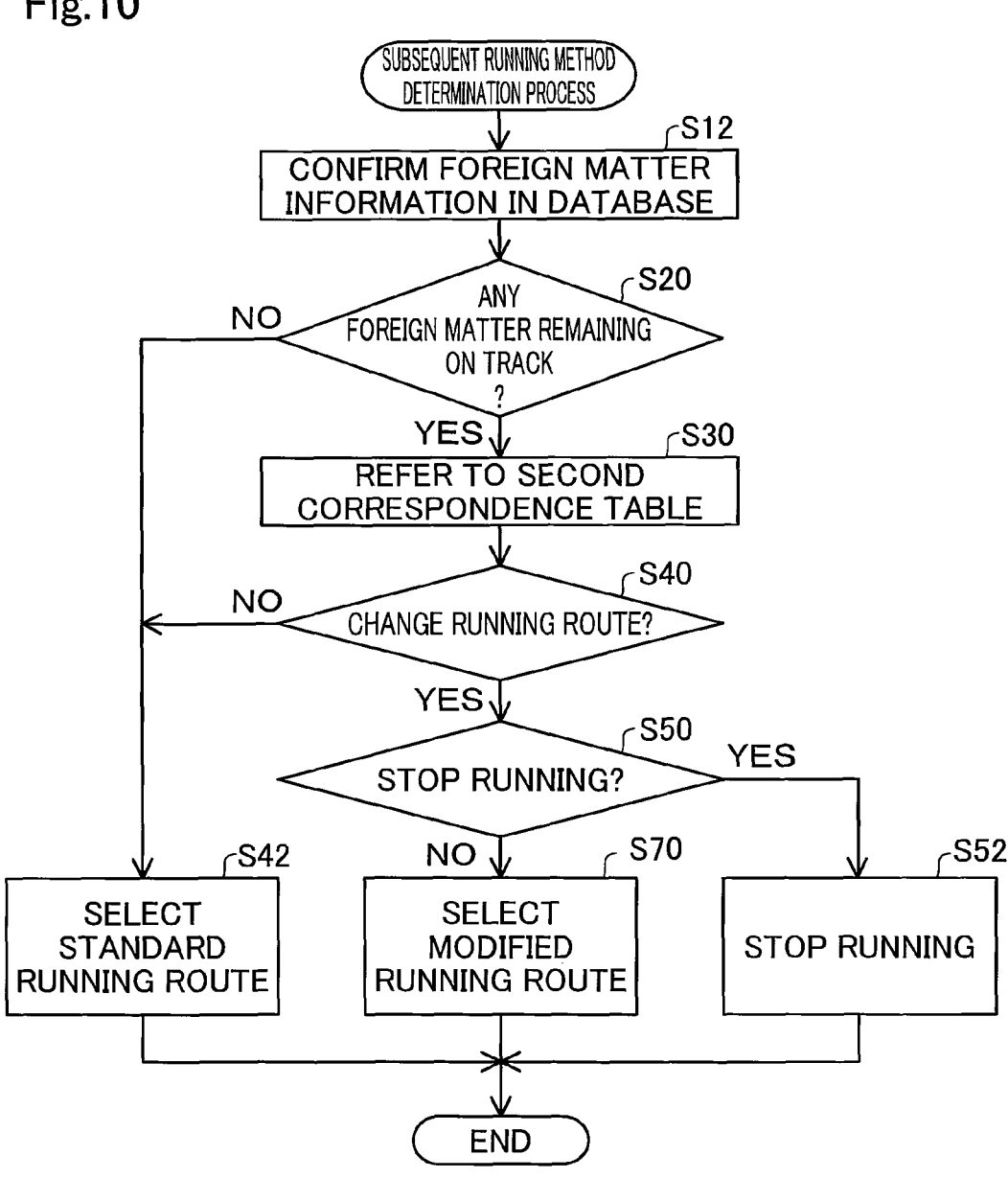
FIG. 10 is a flowchart of a process routine of a subsequent running method determination process.

FIG. 10 is a flowchart showing a process routine of a subsequent running method determination process. In the step S12, the running method determination unit 316 confirms the foreign matter information 322 stored in the storage device 320 of the server 300. In the step S20, the running method determination unit 316 confirms whether or not the foreign matter information 322 has any foreign matter FM that has already been detected, i.e., whether or not there is a foreign matter FM remaining on the track RT. In the case where there is no remaining foreign matter FM (S20: NO), the process moves to the step S42. In the step S42, the running method determination unit 316 sets the running route of the vehicle 100 to a standard running route. The standard is set in advance. In the case where there is a remaining foreign matter FM on the track RT (S20: YES), the running method determination unit 316 moves the process to the step S30.

In the step S30, the running method determination unit 316 determines the subsequent running route by referring to the foreign matter information 322 regarding the remaining foreign matter FM and the second correspondence table 326. In the step S40, the running method determination unit 316 determines whether or not the determined subsequent running route is a route that has been changed from the standard running route. In the case where there is no change from the standard running route (S40: NO), the running method determination unit 316 moves the process to the step S42. In the case where there is a change from the standard running route (S40: YES), the running method determination unit 316 moves the process to the step S50.

In the step S50, the running method determination unit 316 confirms whether or not the running route after the change is to stop the running of the vehicle 100. When it is to stop the running of the vehicle 100 (S50: YES), the running method determination unit 316 moves the process to the step S52. In the step S52, the running method determination unit 316 determines a subsequent running method so that the running of the vehicle 100 is stopped, and ends the process. When it is not to stop the running of the vehicle 100 (S50: NO), the running method determination unit 316 moves the process to the step S70. In the step S70, the running method determination unit 316 sets the subsequent running route to a running route according to the second correspondence table 326, and ends the process.

Referring back to FIG. 8, in the step S100, the remote control unit 312 initiates driving control of the vehicle 100 by remote control according to the subsequent running method determined in the step S10 or the standard running route. The initiation of the driving control of the vehicle 100 causes the vehicle 100 to start running toward the post-process 60. The remote control unit 312 uses captured images acquired by the camera 80 to perform self-running conveyance of the vehicle 100 by remote control. In the step S110, the foreign matter detection unit 314 acquires captured images of the track RT from the camera 80.

In the step S120, the foreign matter detection unit 314 performs image analysis of the acquired captured image, and determines whether or not there is a new foreign matter FM on the track RT In the case where there is no foreign matter FM (S120: NO), the foreign matter detection unit 314 moves the process to the step S130.

In the step S130, the remote control unit 312 causes the vehicle 100 to run according to the determined running route. In the step S140, the remote control unit 312 confirms whether or not the vehicle 100 has arrived at the placement position PG where the vehicle 100 is entered into the post-process 60. In the case where the vehicle 100 has arrived at the placement position PG (S140: YES), the process is ended. If the vehicle 100 has not arrived at the placement position PG (S140: NO), the process returns to the step S110.

In the step S120, in the case where the foreign matter detection unit 314 detects a new foreign matter FM on the track RT (S120: YES), the process moves to the step S200. In the step S200, the foreign matter detection unit 314 performs object recognition of the foreign matter FM, as image analysis using captured images. In the step S210, the foreign matter detection unit 314 specifies the type and the number of the foreign matter FM, the location of the foreign matter FM on the track RT, the location of occurrence of the foreign matter FM, and the like, by image analysis. The results of the analysis by the foreign matter detection unit 314 are stored in the storage device 320 and updated as the foreign matter information 322.

In the step S230, the foreign matter detection unit 314 determines whether or not the foreign matter FM is an item having been installed in the vehicle 100. In the case where the foreign matter detection unit 314 determines that the foreign matter FM is an item having been installed in the vehicle 100 (S230: YES), the process moves to the step S240. In the step S240, the running method determination unit 316 determines the running method of the vehicle 100 by referring to the results of the analysis by the foreign matter detection unit 314 and the first correspondence table 324.

In the step S230, when it is determined that the foreign matter FM is not an item having been installed in the vehicle 100 (S230: NO), the process moves to the step S242. In the step S242, it is confirmed whether or not the location of the new foreign matter FM is ahead of the vehicle 100. In the case where the location of the foreign matter FM is ahead of the vehicle 100, i.e., in the case where the foreign matter FM is present on the running route where the vehicle 100 is to run (S242: YES), the process moves to the step S244. In the case where the location where the foreign matter FM occurred is not ahead of the vehicle 100 (S242: NO), the process moves to the step S130. In the step S244, the running method determination unit 316 determines the subsequent vehicle running method of the vehicle 100 that is a subsequent vehicle by referring to the results of the analysis by the foreign matter detection unit 314 and the second correspondence table 326.

In the step S250, the running method determination unit 316 confirms whether or not there is any change from the running route where the vehicle 100 is currently running. When there is a change (S250: YES), the running method determination unit 316 moves the process to the step S260. When there is no change (S250: NO), the running method determination unit 316 moves the process to the step S130. In the step S260, the running method determination unit 316 confirms whether or not the running route after the change is to stop the running of the vehicle 100. When it is to stop the running of the vehicle 100 (S260: YES), the process moves to the step S262, and the remote control unit 312 stops the running of the vehicle 100, and ends the process. In this case, it is preferable to report the fact that the vehicle 100 has stopped running to the workers and the like in the factory FC. When it is not to stop the running of the vehicle 100 (S260: NO), the running method determination unit 316 moves the process to the step S270. In the step S270, the running method determination unit 316 generates a new running route, and moves the process to the step S130.

As described above, the server 300 of the present embodiment is equipped with the abnormality detection unit that detects an abnormality by analyzing the results of the detection of target objects by the camera 80, the camera 80 being capable of detecting target objects on the track RT of the vehicle 100, the vehicle 100 being capable of running by unmanned driving. Therefore, abnormalities caused by target objects on the track RT of the vehicle 100 can be detected and inhibition of running of the vehicle 100 by unmanned driving can be suppressed or prevented.

According to the server 300 of the present embodiment, the camera 80 further detects images of the vehicle 100, in addition to target objects on the track RT of the vehicle 100. By using the camera 80 that is used for remote control also for detecting the foreign matter FM, it is possible to detect the foreign matter FM on the track RT without newly providing a dedicated detector. Therefore, it is possible to detect the foreign matter FM on the track RT while suppressing or preventing an increase in the number of parts of the system 500.

The server 300 of the present embodiment further includes the running method determination unit 316 that determines the running method using the information regarding the detected foreign matter FM. The running method includes whether or not the vehicle 100 is capable of running and changes in the destination for which the vehicle 100 is to be headed. This allows determination of an appropriate running method for the vehicle 100 according to the detected foreign matter FM.

According to the server 300 of the present embodiment, the foreign matter detection unit 314 analyzes captured images of the camera 80 and further determines whether the detected foreign matter FM is a liquid or not. In the case where the foreign matter FM is a liquid, the foreign matter detection unit 314 further specifies the type of the liquid. The running method determination unit 316 determines the running method using the specified liquid type. Therefore, when the foreign matter FM is a liquid, it is possible to determine an appropriate running method for the vehicle 100 according to the type of the liquid.

According to the server 300 of the present embodiment, when the foreign matter FM is a liquid, the foreign matter detection unit 314 further determines whether or not the amount of the liquid is equal to or more than the predetermined first threshold. The running method determination unit 316 determines to stop the vehicle 100 when the amount of the liquid is equal to or more than the first threshold. The running method determination unit 316 changes the destination for which the vehicle 100 is to be headed to the repair process 40 when the amount of the liquid is less than the first threshold. When the foreign matter FM is a liquid, by determining the degree of the influence of the foreign matter FM on the running of the vehicle 100 using the amount of the liquid, it is possible to determine an appropriate running method for the vehicle 100 according to the influence of the liquid on the running of the vehicle 100.

According to the server 300 of the present embodiment, the foreign matter detection unit 314 analyzes the detection results of the camera 80, and further determines whether or not the detected foreign matter FM is a vehicle part of the vehicle 100. When the foreign matter FM is a vehicle part, the foreign matter detection unit 314 further specifies the type of the vehicle part. The running method determination unit 316 determines the running method using the specified type of the vehicle part. Therefore, when the foreign matter FM is a vehicle part, it is possible to determine an appropriate running method for the vehicle 100 according to the type of the vehicle part.

According to the server 300 of the present embodiment, when the foreign matter FM is determined to be a vehicle part, the foreign matter detection unit 314 further determines whether or not the volume or number of the vehicle part is equal to or more than the predetermined second threshold. The running method determination unit 316 determines to stop the vehicle 100 when the volume or number of the vehicle part is equal to or more than the second threshold. The running method determination unit 316 changes the destination for which the vehicle 100 is to be headed to the repair process 40 when the volume or number of the vehicle part is less than the second threshold. When the foreign matter FM is a vehicle part, by determining the degree of the influence of the foreign matter FM on the running of the vehicle 100 using the volume or number of the vehicle part, it is possible to determine an appropriate running method for the vehicle 100 according to the influence of the vehicle part on the running of the vehicle 100.

According to the server 300 of the present embodiment, the running method determination unit 316 further determines a subsequent running method using the information regarding the detected foreign matter FM. The subsequent running method includes whether or not the subsequent vehicle that runs after the foreign matter FM is detected is capable of running, and the subsequent running route where the subsequent vehicle runs. This allows determination of an appropriate running method for the subsequent vehicle according to the detected foreign matter FM.

According to the server 300 of the present embodiment, the foreign matter detection unit 314 analyzes the detection results of the camera 80, and further determines whether the detected foreign matter FM is a liquid or not. In the case where the foreign matter FM is a liquid, the foreign matter detection unit 314 further specifies the type of the liquid. The running method determination unit 316 determines the subsequent running method using the specified liquid type. Therefore, when the foreign matter FM is a liquid, it is possible to determine an appropriate running method for the subsequent vehicle according to the type of the liquid.

According to the server 300 of the present embodiment, when the foreign matter FM is a liquid, the foreign matter detection unit 314 further determines whether or not the amount of the liquid is equal to or more than the predetermined third threshold. The running method determination unit 316 determines to stop the subsequent vehicle when the amount of the liquid is equal to or more than the third threshold, or changes the subsequent running route to a subsequent running route where contact between the subsequent vehicle and the liquid can be avoided when the amount of the liquid is less than the third threshold. When the foreign matter FM is a liquid, by determining the degree of the influence of the foreign matter FM on the running of the subsequent vehicle using the amount of the liquid, it is possible to determine an appropriate running method for the subsequent vehicle according to the influence of the liquid on the running of the subsequent vehicle.

According to the server 300 of the present embodiment, the foreign matter detection unit 314 analyzes the detection results of the camera 80, and further determines whether or not the detected foreign matter FM is a vehicle part. When the foreign matter FM is specified as a vehicle part, the foreign matter detection unit 314 further specifies the type of the vehicle part. The running method determination unit 316 determines the subsequent running method using the specified type of the vehicle part. Therefore, when the foreign matter FM is a vehicle part, it is possible to determine an appropriate running method for the subsequent vehicle according to the type of the vehicle part.

According to the server 300 of the present embodiment, when the foreign matter FM is determined to be a vehicle part, the foreign matter detection unit 314 further determines whether or not the volume or number of the vehicle part is equal to or more than the predetermined fourth threshold. The running method determination unit 316 determines to stop the subsequent vehicle when the volume or number of the vehicle part is equal to or more than the fourth threshold. The running method determination unit 316 changes the running route to a subsequent running route where contact between the subsequent vehicle and the vehicle part can be avoided when the volume or number of the vehicle part is less than the fourth threshold. When the foreign matter FM is a vehicle part, by determining the degree of the influence of the foreign matter FM on the running of the subsequent vehicle using the volume or number of the vehicle part, it is possible to determine an appropriate running method for the subsequent vehicle according to the influence of the vehicle part on the running of the subsequent vehicle.

According to the server 300 of the present embodiment, the foreign matter detection unit 314 analyzes the detection results of the vehicle detector to further extract the detection position and the detection timing of the detected foreign matter FM, and determines whether or not the foreign matter FM is an item having been installed in the vehicle 100 using the extracted detection position and detection timing. By the determination as to whether or not the foreign matter FM is an item having been installed in the vehicle 100, it is possible to presume whether or not the vehicle 100 has a defect related to the foreign matter FM2. This allows early detection of the defect related to the foreign matter FM2 and perform prompt repair of the vehicle 100.

According to the server 300 of the present embodiment, the running method determination unit 316 changes the destination for which the vehicle 100 is to be headed to the repair process 40 when the foreign matter FM is determined to be an item having been installed in the vehicle 100. This allows the vehicle 100 to run to the repair process 40 promptly, thus allowing prompt repair of the vehicle 100.

B. Second Embodiment

Figure 11:
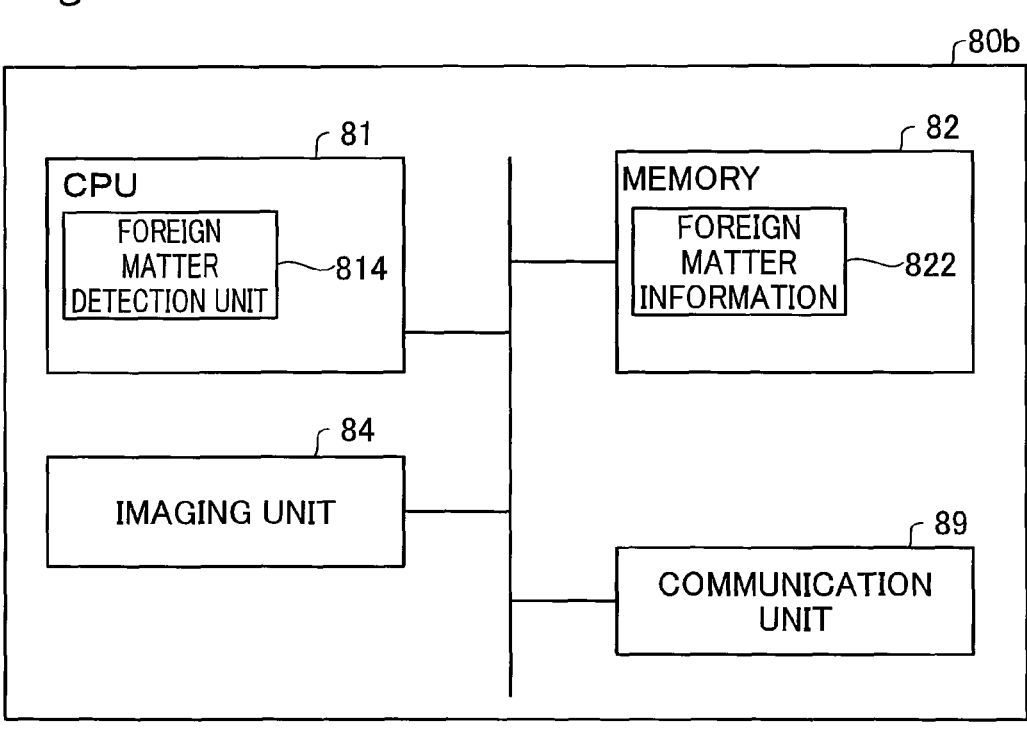
FIG. 11 is a block diagram of an internal functional structure of a camera installed in a system including an abnormality detection device according to a second embodiment.
Figure 12:
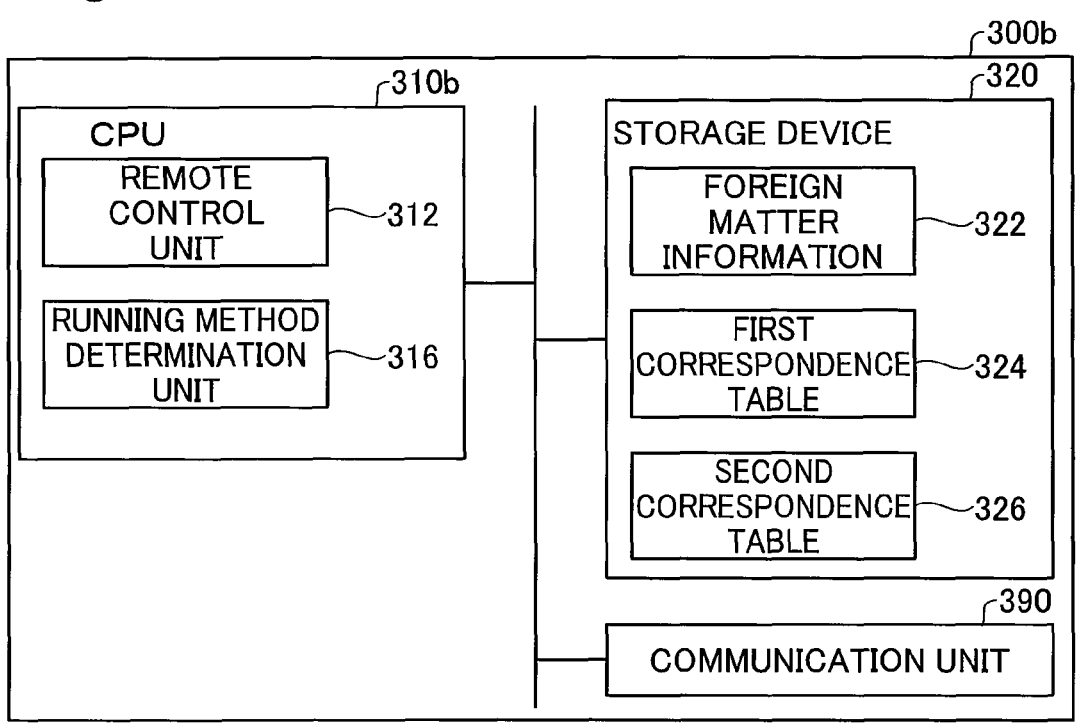
FIG. 12 is a block diagram of an internal functional structure of a server installed in the system according to the second embodiment.

FIG. 11 is a block diagram of an internal functional structure of a camera 80b of a system 500 including an abnormality detection device according to the second embodiment. FIG. 12 is a block diagram of an internal functional structure of a server 300b of the system 500 according to the second embodiment. The server 300b differs from the server 300 of the first embodiment shown in FIG. 2 in that the server 300b does not have the foreign matter detection unit 314, and is otherwise similar to the server 300 of the first embodiment in its configuration.

In the present embodiment, the camera 80b includes a CPU 81 as a central processing unit, a memory 82 such as ROM or RAM, an imaging unit 84, and a communication unit 89. These components are connected to one another via internal buses and interface circuits. The imaging unit 84 functions as a detection unit that detects the track RT and target objects on the track RT. Further, the imaging unit 84 acquires images of the vehicle 100 as the vehicle information. When the vehicle detector is a device that detects the location of the vehicle 100 using a method other than images, for example, such as LiDAR, an emission unit that emits light or ultrasonic waves to detect the location of the vehicle 100, and a reception unit that receives reflected light or waves, etc. resulting from reflection of the emitted light or ultrasonic waves by the vehicle 100 function as the detection unit. The foreign matter detection unit 814 has the same function as that of the foreign matter detection unit 314 shown in FIG. 2, and functions as an abnormality detection unit that detects foreign matters FM in the factory FC by performing image analysis of captured images acquired by the imaging unit 84. The results of the analysis of captured images by the foreign matter detection unit 814 are stored in the memory 82 as foreign matter information 822 and transmitted to the server 300 to be used by the running method determination unit 316 to determine the running method, and the like.

The camera 80b of the present embodiment includes the imaging unit 84 as a target object detection unit, and the foreign matter detection unit 814. The target object detection unit is capable of detecting vehicle information including images of the vehicle 100 running on the track RT, and target objects on the track RT. The foreign matter detection unit 814 analyzes the detection results of the imaging unit 84 to detect the foreign matter FM on the track RT. The camera 80b of the present embodiment is capable of performing both acquisition of vehicle information such as images of the vehicle 100, and detection of the foreign matter FM on the track RT. Therefore, it is possible to detect the foreign matter FM on the track RT without newly providing a dedicated detector, thereby detecting the foreign matter FM on the track RT while suppressing or preventing an increase in the number of parts in the factory FC.

C. Third Embodiment

Figure 13:
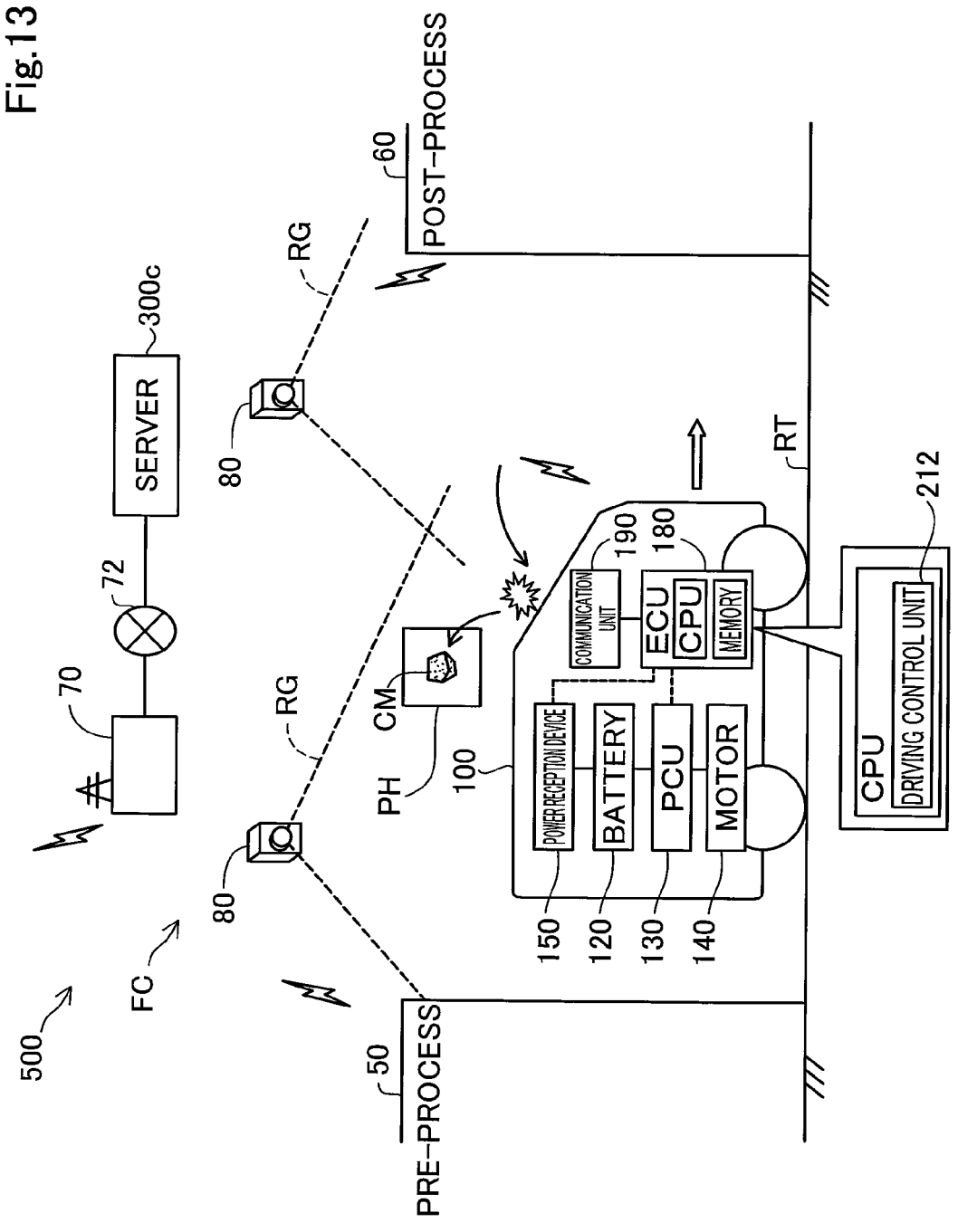
FIG. 13 is an explanatory view of a schematic structure of a system including an abnormality detection device according to a third embodiment.

FIG. 13 is an explanatory view of a schematic structure of a system 500 including an abnormality detection device according to the third embodiment. The system 500 differs from that of the first embodiment in that a server 300c as the abnormality detection device of the third embodiment is provided instead of the server 300, and is otherwise similar to the first embodiment in its configuration. In the present embodiment, the camera 80 also functions as a detection device capable of detecting target objects around the vehicle 100, in addition to vehicle information.

Figure 14:
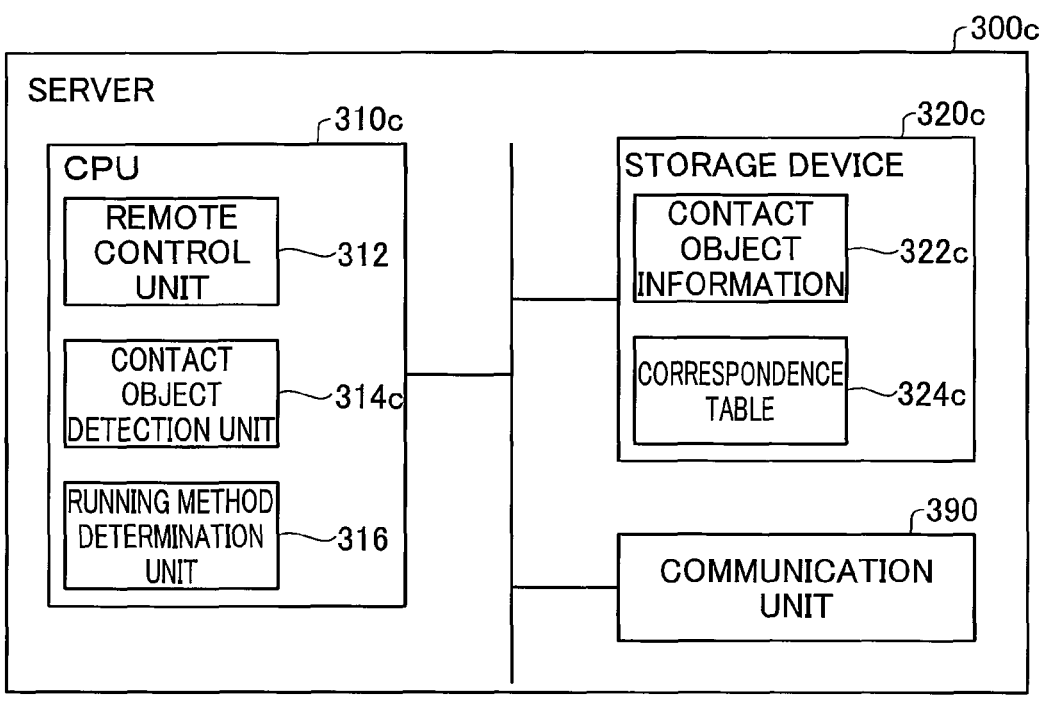
FIG. 14 is a block diagram of an internal functional structure of a server.

FIG. 14 is a block diagram of an internal functional structure of the server 300c. The server 300c differs from the server 300 shown in the first embodiment in that the server 300c has a CPU 310c instead of the CPU 310 and a storage device 320c instead of the storage device 320, and is otherwise similar to the first embodiment in its configuration. The CPU 310c differs from the CPU 310 in that the CPU 310c functions as a contact object detection unit 314c instead of the foreign matter detection unit 314. The storage device 320c differs from the storage device 320 in that the storage device 320c stores contact object information 322c instead of the foreign matter information 322 and stores a correspondence table 324c instead of the first correspondence table 324 and the second correspondence table 326.

The contact object detection unit 314c performs image analysis of an image of a target object around the vehicle 100 captured by the camera 80, and if the target object around the vehicle 100 satisfies a predetermined condition based on the results of the image analysis, the contact object detection unit 314c determines the target object to be a contact object CM, and detects the contact object CM as an abnormality. The contact object detection unit 314c is an embodiment of the abnormality detection unit. The contact object detection unit 314c is capable of specifying or presuming the characteristics of the contact object CM, such as the type, shape, amount, volume, mass, color, number, and the like of the contact object CM, from the captured images of the camera 80, using known object recognition algorithms. The results of the analysis of captured images by the contact object detection unit 314c are stored in the storage device 320c as contact object information 322c.

The running method determination unit 316 determines the running method of the vehicle 100 using the information regarding the contact object CM detected by the contact object detection unit 314c, the running method including whether or not the vehicle 100 is capable of running and the destination for which the vehicle 100 is to be headed. The "running method of the vehicle 100" may also be referred to as the "way of driving" or "driving details" of the vehicle 100. For example, if the abnormality of the vehicle 100 due to the contact object CM is presumed, the destination for which the vehicle 100 is to be headed is changed to a destination where the abnormality of the vehicle 100 can be solved, such as a repair process. The destination for which the vehicle 100 is to be headed may be changed to a destination where the contact object CM remaining on the vehicle 100 can be removed, such as a process of removing the contact object. In the present embodiment, the running method determination unit 316 determines the running method of the vehicle 100 using the correspondence table 324c stored in the storage device 320c.

In the present embodiment, the running method determination unit 316 further determines a subsequent running method for the subsequent vehicle using the information regarding the detected contact object CM, the subsequent running method including whether or not the subsequent vehicle is capable of running and the subsequent running route where the subsequent vehicle runs. The "subsequent vehicle" here refers to a vehicle 100 running on the track RT on which the contact object CM may remain after the contact object CM is detected. In the present embodiment, the running method determination unit 316 determines the running method of the subsequent vehicle using the correspondence table 324c. For example, when the contact object CM remaining on the track RT interferes with the running of the subsequent vehicle, the running method determination unit 316 determines a running method that can avoid contact with the contact object CM. For example, when a running route where the vehicle 100 can run cannot be generated, the running method determination unit 316 stops the running of the vehicle 100.

FIG. 15 is an explanatory view of an example of the correspondence table 324c. The correspondence table 324c defines the type of the contact object CM, and the running method for the vehicle 100 and the subsequent running method for the subsequent vehicle corresponding to the type of the contact object CM. The correspondence table 324c may be configured, for example, by setting the degree of damage that may be caused on the vehicle 100 by the contact object CM for each type of the contact object CM, and setting the running method and the subsequent running method corresponding to the degree of the set damage. The types of the contact objects are not limited only to the examples shown in FIG. 15, and may include a variety of target objects that may come in contact with the vehicle 100 running or stopping on the track RT.

As shown in FIG. 15, when the contact object detection unit 314c specifies the contact object CM as a "vehicle part", the running method determination unit 316 changes the running route of the vehicle 100, which has come in contact with the contact object CM, to a running route in which the vehicle 100 is to be headed for the repair process 40. In this case, the running method determination unit 316 changes the subsequent running route to a subsequent running route on which the subsequent vehicle runs while avoiding the location on the track RT where the contact object CM is generated. In the case where the contact object CM is an "animal" or a "vehicle", running of the vehicle 100 that came in contact with the contact object CM is stopped. In this case, the running method determination unit 316 changes the track to another track for detouring that is different from the normal track. However, if the foreign matter, such as a vehicle part, is removed by workers or the like immediately after the occurrence, the vehicle 100 may be allowed to run as usual without avoiding the contact position. Further, in the case where the type of the contact object CM is a "stone", the running method determination unit 316 does not change the running method for the vehicle 100 which came in contact with the contact object CM and the subsequent running method for the subsequent vehicle.

Figure 16:
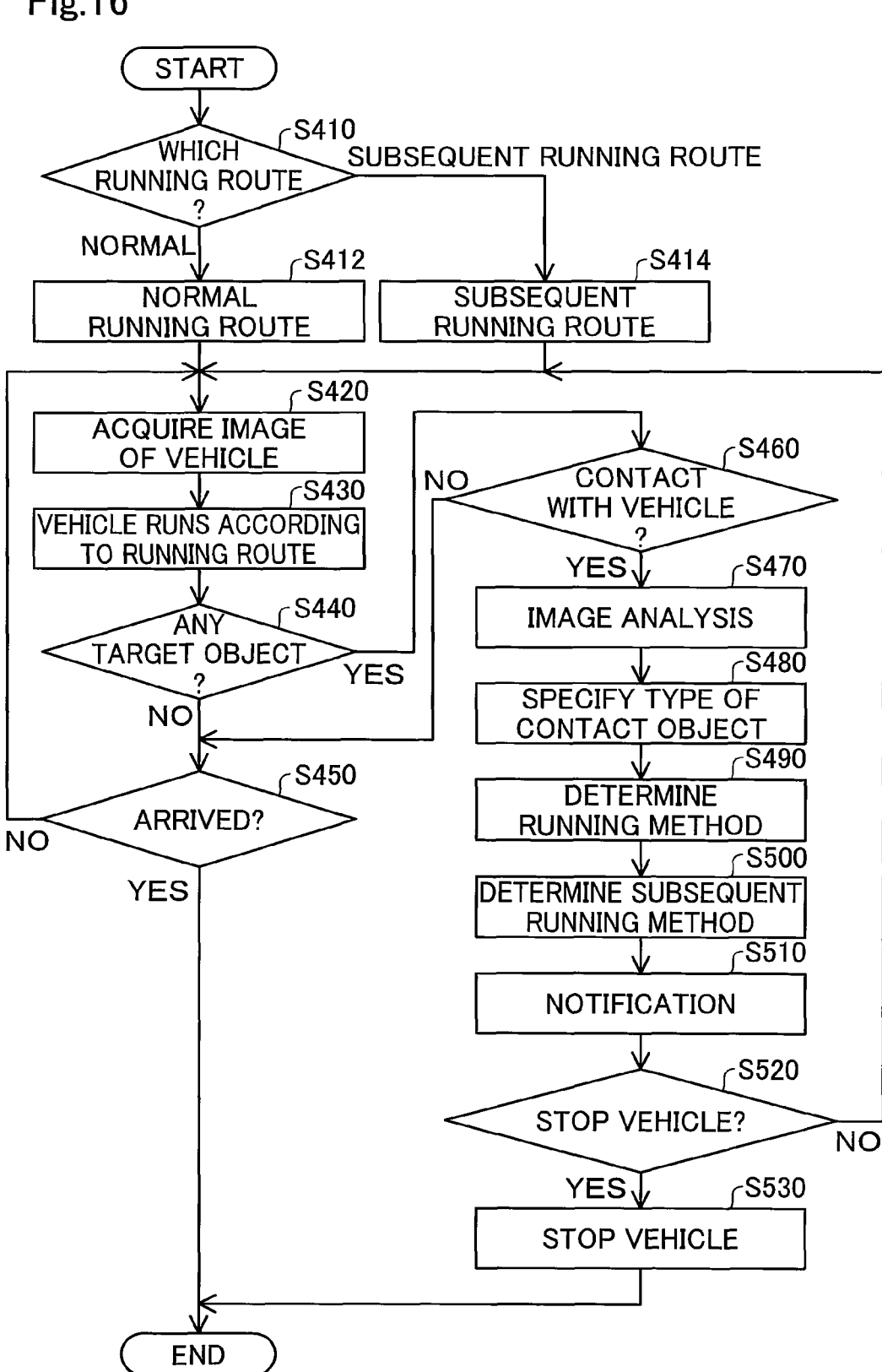
FIG. 16 is a flowchart of a process routine of a vehicle running method determination process performed by an abnormality detection device according to a fourth embodiment.

FIG. 16 is a flowchart of a process routine of a running method determination process for the vehicle 100 performed by an abnormality detection device according to the fourth embodiment. This flow is initiated, for example, when the process by the pre-process 50 is completed and the vehicle 100 is ready to start running.

In the step S410, the running method determination unit 316 confirms the route in which the vehicle 100 runs. For example, if a subsequent running method has already been determined in the previous cycle (S410: subsequent running route), the running method determination unit 316 forwards the process to the step S414. In the step S414, the running method determination unit 316 sets a route in which the vehicle 100 runs to a subsequent running route according to the subsequent running method that has already been determined. The running method determination unit 316 may acquire the contact object information 322c regarding the contact object CM that occurred in the previous cycle. In this case, the running method determination unit 316 may determine the subsequent running method using the acquired contact object information 322c and the correspondence table 324c. In the case where, for example, the subsequent running method was not determined in the previous cycle or no contact object CM was detected in the previous cycle (S410: normal), the running method determination unit 316 forwards the process to the step S412 to set the running route of the vehicle 100 to a predetermined normal running route.

In the step S420, the remote control unit 312 acquires an image of the vehicle 100 as the vehicle information from the camera 80. In the step S430, the remote control unit 312 initiates driving control of the vehicle 100 by remote control according to the subsequent running method determined or the standard running route. In the step S440, the contact object detection unit 314c analyzes the image of the vehicle 100 acquired in the step S420 or analyzes the image of the surroundings of the vehicle 100 separately acquired from the camera 80, thereby identifying target objects in the image. In the case where no target objects are detected in the image (S440: NO), the contact object detection unit 314c forwards the process to the step S450. In the step S450, the remote control unit 312 confirms whether or not the vehicle 100 has arrived at the placement position PG where the vehicle 100 is entered into the post-process 60. In the case where the vehicle 100 has arrived at the placement position PG (S50: YES), the remote control unit 312 ends the process. In the case where the vehicle 100 has not arrived at the placement position PG (S50: NO), the process returns to the step S420.

When a target object is detected in the image (S440: YES), the contact object detection unit 314c forwards the process to the step S460. In the step S460, the contact object detection unit 314c confirms whether or not the detected target object has come in contact with the vehicle 100. The contact object detection unit 314c, for example, performs image analysis of the image at the time point when the target object was detected and a plurality of images at the timings before and after the image. When the contact object detection unit 314c detects that the occupation region of the target object in the image overlaps with the occupation region of the vehicle 100 in the image, the contact object detection unit 314c determines that the target object has come in contact with the vehicle 100. The contact object detection unit 314c may confirm whether the traveling direction of the target object changes around the vehicle 100, and, if the traveling direction of the target object changes, determines that the target object has come in contact with the vehicle 100. When it is determined that the target object is not in contact with the vehicle 100 (S460: NO), the contact object detection unit 314c forwards the process to the step S450. When it is determined that the target object has come in contact with the vehicle 100 (S460: YES), the contact object detection unit 314c specifies the target object that has come in contact with the vehicle 100 as the contact object CM, and forwards the process to the step S470.

In the step S470, the contact object detection unit 314c starts image analysis of the contact object CM. In the step S480, the contact object detection unit 314c specifies the type of the contact object CM as a result of image analysis. In the step S490, the running method determination unit 316 determines the running method for the vehicle 100 corresponding to the specified type of the contact object CM, using the correspondence table 324c stored in the storage device 320c. In the step S500, the running method determination unit 316 determines the subsequent running method corresponding to the specified type of the contact object CM using the correspondence table 324c. In the step S510, the running method determination unit 316 gives a notification of the contact between the contact object CM and the vehicle 100 and also a notification to require removal of the contact object CM from the track RT to, for example, the workers of the post-process 60, etc., or the administrator of the system 500. The notification can be given, for example, by displaying it on a display used in the post-process 60, by a production state notification device or an abnormality notification device, or by voice or the like through a speaker provided in the vehicle 100, and the like. When the removal of the contact object CM is completed, the subsequent running method determined in the step S500 may be reset.

In the step S520, the running method determination unit 316 confirms whether or not the determined running method of the vehicle 100 is to stop the vehicle 100. When it is not to stop the vehicle 100 (S520: NO), the running method determination unit 316 returns the process to the step S420. In this case, the remote control unit 312 makes the vehicle 100 run according to the running method determined in the step S490. When it is to stop the vehicle 100 (S520: YES), the running method determination unit 316 forwards the process to the step S530 to stop the running of the vehicle 100, and ends the process.

As described above, the server 300c of the present embodiment includes the remote control unit 312 that causes the vehicle 100 to run by remote control using images of the vehicle 100 as the vehicle information, the camera 80 capable of detecting images of the vehicle 100 and target objects around the vehicle 100, and the contact object detection unit 314c that analyzes results of detection of the target object by the camera 80 and detects the contact object CM that has come in contact with the vehicle 100. By using the camera 80 used for remote control also for detecting the contact object CM, it is possible to detect the contact object CM with respect to the vehicle 100 without newly providing a detector dedicated for the detection of contact objects. Therefore, it is possible to detect the contact object CM with respect to the vehicle 100 while suppressing or preventing an increase in the number of parts of the system 500.

The server 300c of the present embodiment includes the running method determination unit 316 that determines the running method of the vehicle 100 using the results of image analysis of the detected contact object CM, the running method of the vehicle 100 includes whether or not the vehicle 100 is capable of running and the destination for which the vehicle 100 is to be headed. This allows determination of an appropriate running method for the vehicle 100 according to the detected contact object CM.

According to the server 300c of the present embodiment, the contact object detection unit 314c analyzes the images captured by the camera 80 and further identifies the type of the detected contact object CM. The running method determination unit 316 determines the running method of the vehicle 100 using the identified type of the contact object CM. This allows determination of an appropriate running method for the vehicle 100 according to the type of the contact object CM.

According to the server 300c of the present embodiment, the running method determination unit 316 further determines the subsequent running method using the information regarding the detected contact object CM, the subsequent running method including whether or not the subsequent vehicle is capable of running, and the subsequent running route where the subsequent vehicle runs, the subsequent vehicle running after the contact object CM is detected. This allows the vehicle 100 to appropriately run according to the contact object CM remaining on the track RT.

According to the server 300c of the present embodiment, the contact object detection unit 314c gives a notification to require removal of the contact object CM when the contact object CM is detected. By having the contact object CM removed promptly, it is possible to prevent change of the running route of the vehicle 100 to the subsequent running route. By thus preventing change of the running route of the vehicle 100 and stabilizing the running route for each of the vehicles 100 being manufactured, decrease in the productivity of the vehicle 100 can be prevented.

D. Fourth Embodiment

Figure 17:
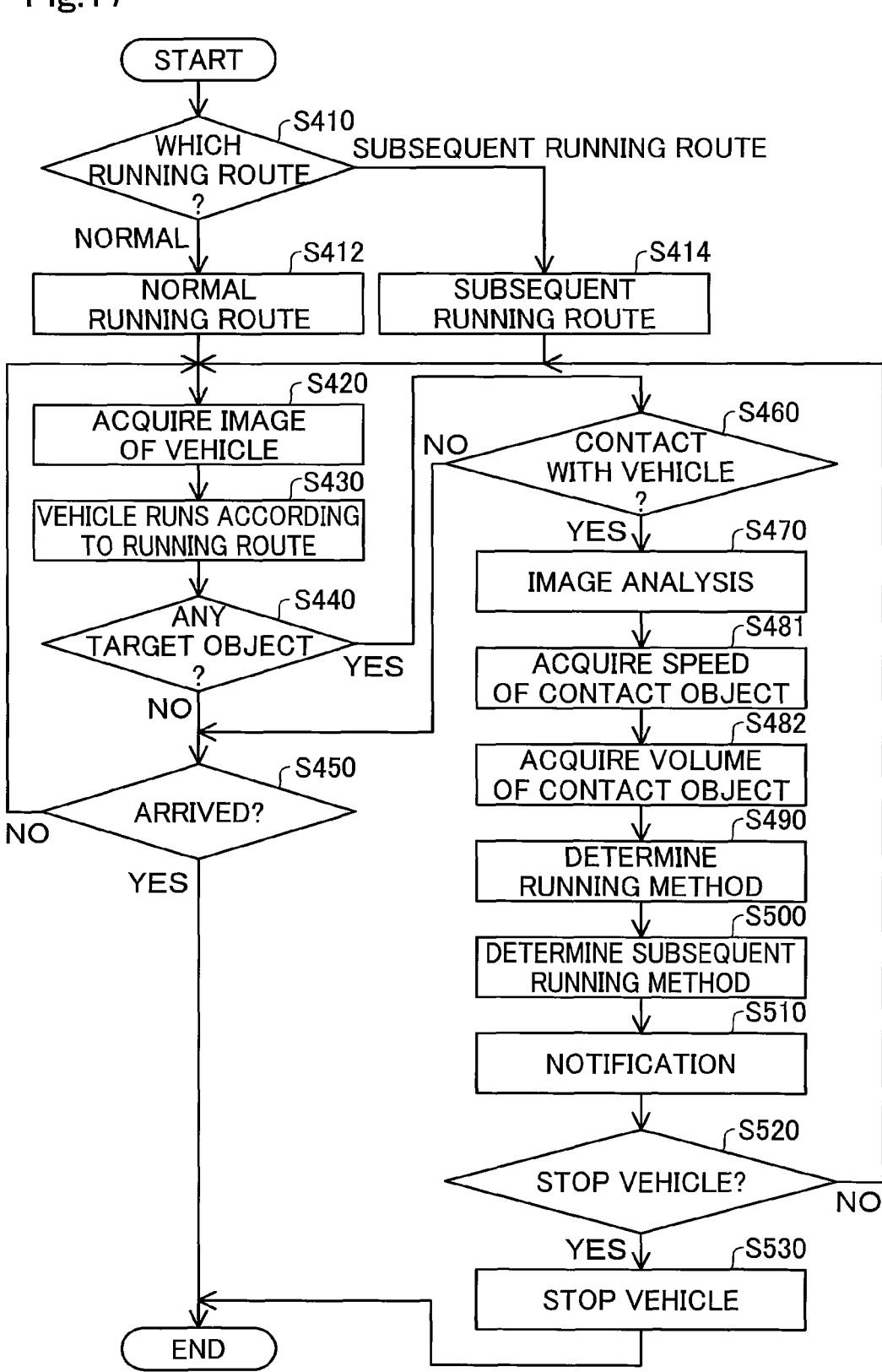
FIG. 17 is a flowchart of a process routine of a vehicle running method determination process performed by the abnormality detection device according to the fourth embodiment.

FIG. 17 is a flowchart of a process routine of a running method determination process for the vehicle 100 performed by an abnormality detection device according to the fourth embodiment. This flow differs from the running method determination process shown in the third embodiment in that the steps S481 and S482 are provided instead of the step S480. The configuration of the system 500 differs from that of the third embodiment in that a correspondence table 324d, which is described later, is stored in the storage device 320 of the server 300 instead of the correspondence table 324c; otherwise, the configuration of the system 500 is similar to that of the third embodiment.

The third embodiment described above shows an example in which the contact object detection unit 314c specifies the type of the contact object CM by analysis of an image of the contact object CM, and the running method determination unit 316 determines the running method of the vehicle 100 corresponding to the specified type of the contact object CM using the correspondence table 324. In contrast, in the present embodiment, the contact object detection unit 314c acquires the speed of the contact object CM and the volume of the contact object CM instead of the type of the contact object CM. The running method determination unit 316 determines the running method of the vehicle 100 corresponding to the speed of the contact object CM and the volume of the contact object CM using the correspondence table 324d described later. The "speed of the contact object CM" refers to the speed of the contact object CM relative to the vehicle 100.

In the step S481, the contact object detection unit 314c acquires the speed of the contact object CM by image analysis. The speed of the contact object CM can be calculated, for example, by using the frame rate of a plurality of consecutive captured images acquired by the camera 80 and the moving distance of the contact object CM between the plurality of captured images. In the present embodiment, the speed of the contact object CM immediately before the contact object CM comes in contact with the vehicle 100 is acquired. In contrast, the average speed of the contact object CM until it comes in contact with the vehicle 100 may be acquired, or the speed of the contact object CM after it comes in contact with the vehicle 100 may be acquired.

In the step S482, the contact object detection unit 314c acquires the volume of the contact object CM as a result of image analysis. Instead of the volume of the contact object CM, the area of the contact object CM in the image may be acquired. The volume of the contact object CM can be calculated, for example, by acquiring the three-dimensional shape of the contact object CM using a plurality of cameras 80. In the case where the image captured by the cameras 80 is a two-dimensional image, the volume of the contact object CM may be presumed by approximating or estimating the three-dimensional shape of the contact object CM from the region of the contact object CM extracted from the two-dimensional image. Further, it is also possible to specify the type of the contact object CM from the image captured by the cameras 80, and use the catalog value, nominal value, or average value of the volume of the specified type of the contact object CM. In the step S490, the running method determination unit 316 determines the running method and the subsequent running method of the vehicle 100 using the acquired speed and volume of the contact object CM, as well as the correspondence table 324d.

Figure 18:
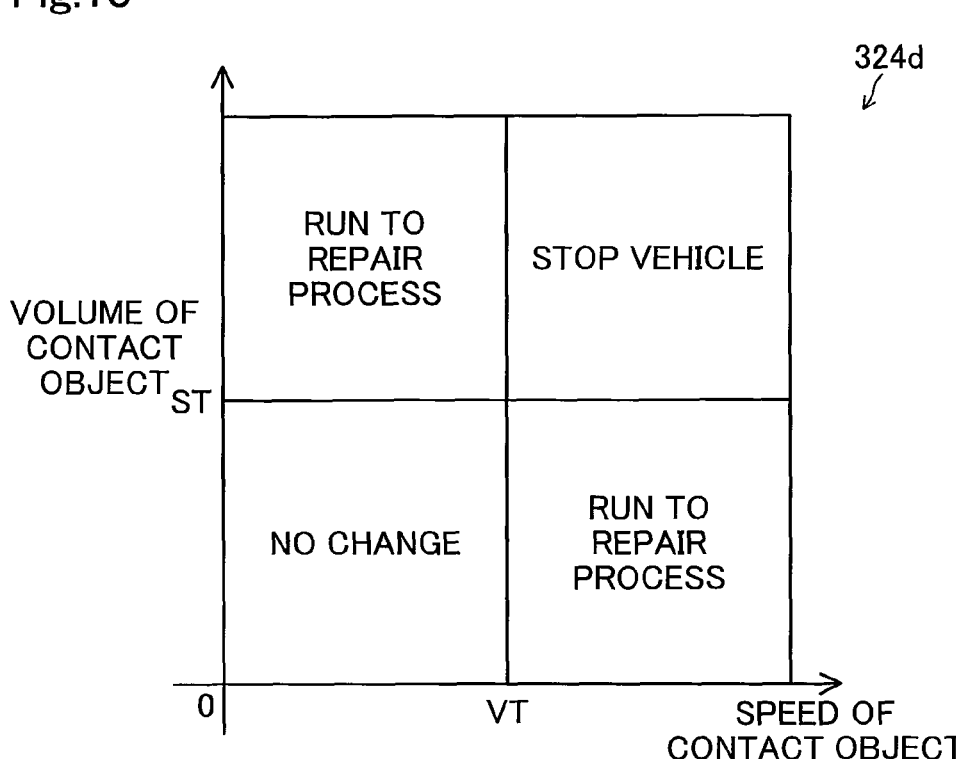
FIG. 18 is an explanatory view of an overview of a correspondence table of the abnormality detection device of the fourth embodiment.

FIG. 18 is an explanatory view of an overview of the correspondence table 324d of the abnormality detection device of the fourth embodiment. As shown in FIG. 18, the present embodiment uses a correspondence map in which the vertical axis represents the volume of the contact object CM and the horizontal axis represents the speed of the contact object CM. In the case where the volume of the contact object CM is large and the speed of the contact object CM is high, in other words, if the kinetic energy of the contact object CM is large, it can be presumed that the possible damage to be caused on the vehicle 100 having been in contact with the contact object CM is large. Specifically, in the correspondence table 324d, instead of the type of the contact object CM, the running method and the subsequent running method are set corresponding to the risk level that can be presumed from the kinetic energy of the contact object CM.

As shown in FIG. 18, a predetermined threshold ST is set for the volume of the contact object CM, and a predetermined threshold VT is set for the speed of the contact object CM. These thresholds can be set as appropriate in consideration of the presumed risk level that the volume and speed of the contact object CM can cause on the vehicle 100. Each threshold for the volume and speed of the contact object CM is not limited to only one threshold, and it is possible to set a plurality of thresholds for each of the volume and speed of the contact object CM.

When the speed of the contact object CM is equal to or more than zero and equal to or less than the threshold VT, and when the volume of the contact object CM is greater than zero and equal to or less than the threshold ST, the running method determination unit 316 does not change the running method of the vehicle 100. When the speed of the contact object CM is greater than the threshold VT and when the volume of the contact object CM is greater than zero and equal to or less than the threshold ST, the running method determination unit 316 changes the running route of the vehicle 100 that has come in contact with the contact object CM to a running route in which the vehicle 100 is to be headed to the repair process 40. In the case where the speed of the contact object CM is equal to or greater than zero and equal to or less than the threshold VT and if the volume of the contact object CM is greater than the threshold ST, the running method determination unit 316 changes the running route of the vehicle 100 that has come in contact with the contact object CM to a running route in which the vehicle 100 is to be headed to the repair process 40. When the speed of the contact object CM is greater than the threshold VT and the volume of the contact object CM is greater than the threshold ST, the running method determination unit 316 stops the running of the vehicle 100. Instead of the volume and speed of the contact object CM, the correspondence table 324d may specify the running method of the vehicle 100 against the kinetic energy of the contact object CM. Further, in addition to the case where both the volume and speed of the contact object CM are acquired, it is also possible to acquire either the volume of the contact object CM or the speed of the contact object CM. Instead of the volume of the contact object CM, the mass of the contact object CM may be used. The mass of the contact object CM may be calculated, for example, by acquiring the volume of the contact object CM and the type of contact object CM by image analysis by the contact object detection unit 314c, and multiplying the acquired volume of the contact object CM by, for example, the nominal value of density for the type of the contact object CM.

According to the server 300c of the present embodiment, the contact object detection unit 314c acquires the speed upon contact of the detected contact object CM with the vehicle 100 by analyzing images captured by the camera 80. The running method determination unit 316 determines the running method of the vehicle 100 using the acquired speed of the contact object CM. This allows determination of an appropriate running method for the vehicle 100 according to the influence on the vehicle 100 presumed from the speed of the contact object CM.

According to the server 300c of the present embodiment, the contact object detection unit 314c analyzes the images captured by the camera 80 and further acquires the volume of the detected contact object CM. The running method determination unit 316 determines the running method using the presumed volume and mass. This allows determination of an appropriate running method for the vehicle 100 according to the influence on the vehicle 100 presumed from the volume of the contact object CM. Further, by acquiring both the speed of the contact object CM and the volume of the contact object CM, the kinetic energy of the contact object CM can be calculated, thereby improving the accuracy in the assumption of the influence on the vehicle 100.

E. Fifth Embodiment

Figure 19:
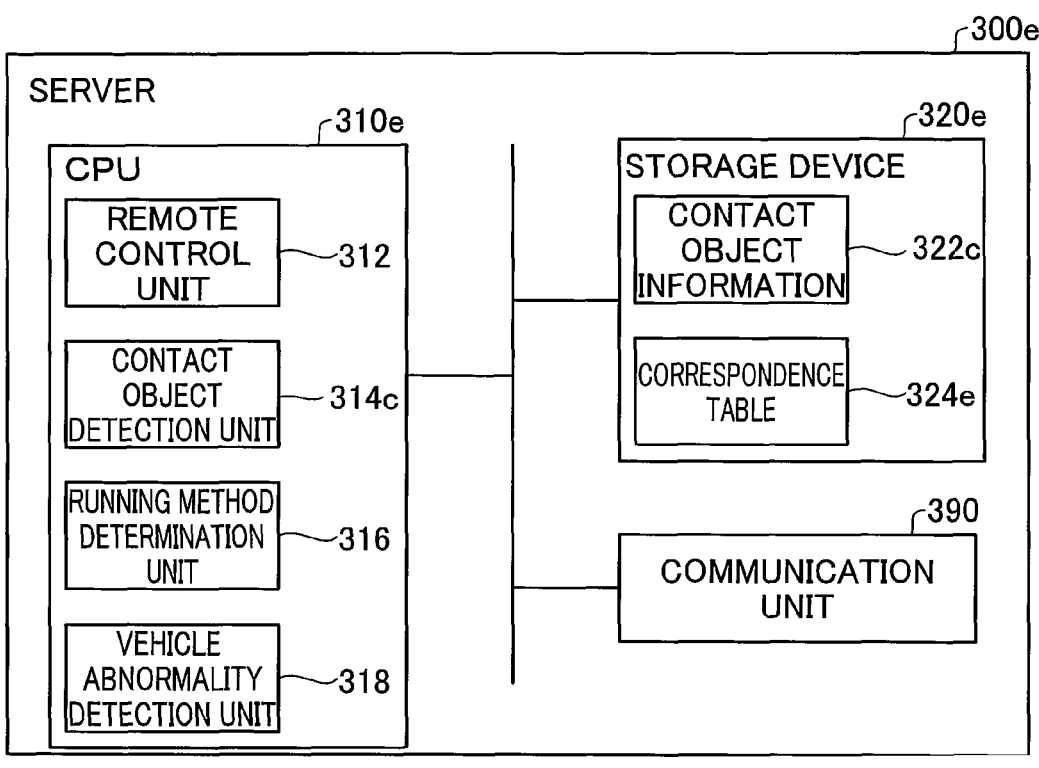
FIG. 19 is a block diagram of an internal functional structure of a server that serves as an abnormality detection device according to a fifth embodiment.

FIG. 19 is a block diagram of an internal functional structure of a server 300e that serves as an abnormality detection device according to the fifth embodiment. The server 300e differs from the server 300c in that the server 300e includes, instead of the storage device 320c, a storage device 320e storing a correspondence table 324e, and also includes, instead of the CPU 310c, a CPU 310e that functions as a vehicle abnormality detection unit 318. In the present embodiment, the contact object detection unit 314c specifies the contact position of the contact object CM in the vehicle 100 by image analysis of images of target objects around the vehicle 100.

The vehicle abnormality detection unit 318 performs image analysis of the contact position of the contact object CM specified by the contact object detection unit 314c. The vehicle abnormality detection unit 318 detects, as a result of image analysis, an abnormality of the vehicle 100 caused by the contact with the contact object CM at the contact position of the contact object CM. The detection of an abnormality by the vehicle abnormality detection unit 318 may only detect the presence or absence of an abnormality, or may specify the type of the abnormality.

Figure 20:
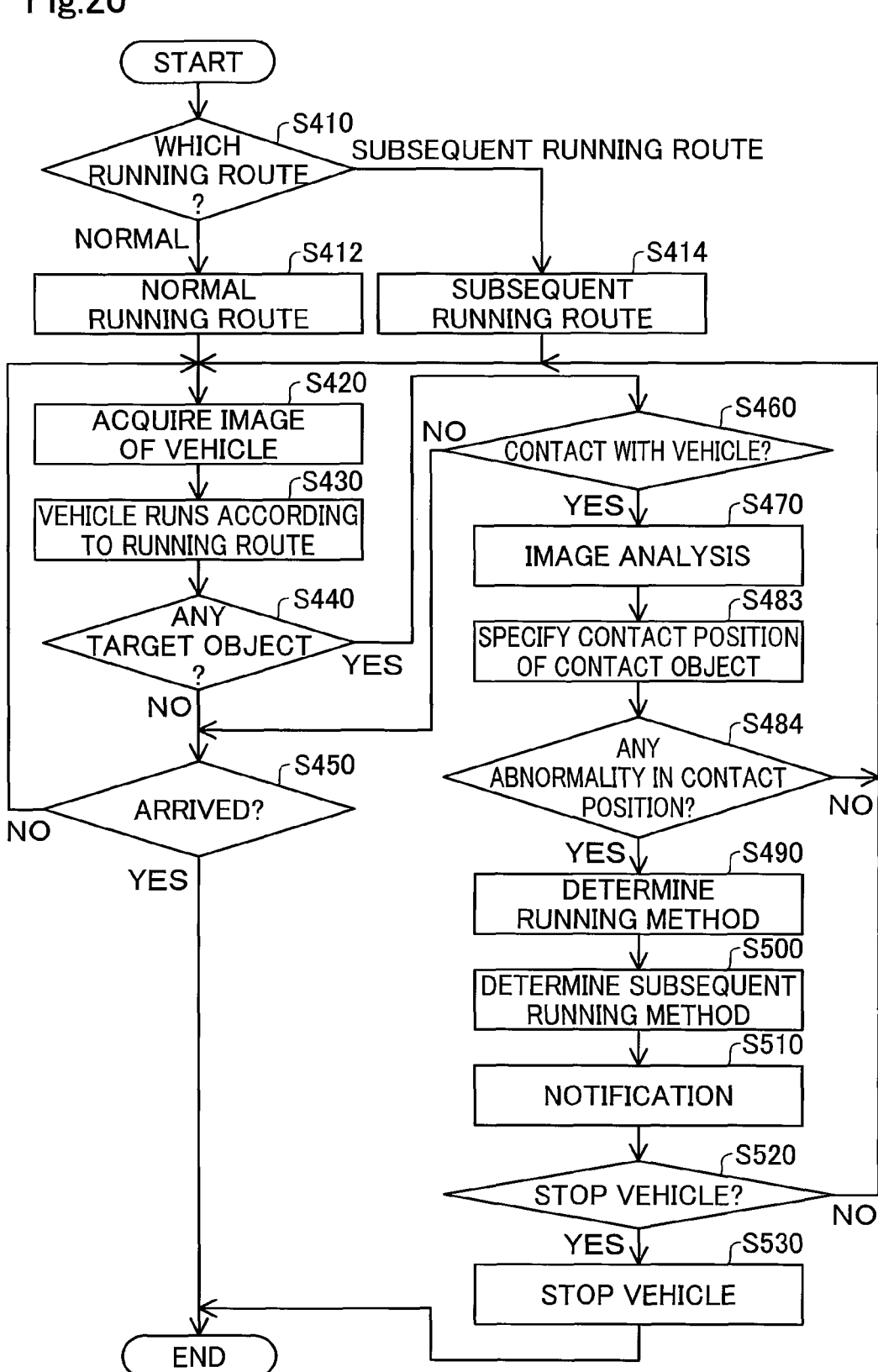
FIG. 20 is a flowchart of a process routine of a vehicle running method determination process performed by the server according to the fifth embodiment.

FIG. 20 is a flowchart of a process routine of a running method determination process for the vehicle 100 performed by the server 300e according to the fifth embodiment. This flow differs from the running method determination process shown in the third embodiment in that the steps S483 and S484 are provided instead of the step S480.

In the step S483, the contact object detection unit 314c specifies the contact position where the contact object CM came in contact with the vehicle 100 by image analysis. In the step S484, the vehicle abnormality detection unit 318 detects the presence or absence of abnormality in the vehicle 100 by analyzing the image of the specified contact position. When it is determined that there is no abnormality in the vehicle 100 (S484: NO), the vehicle abnormality detection unit 318 returns the process to the step S420. When it is determined that the vehicle 100 has an abnormality (S484:

YES), the vehicle abnormality detection unit 318 performs image analysis of the contact position to specify the type of the abnormality in the vehicle 100. In the step S490, the running method determination unit 316 refers to the correspondence table 324e and determines the running method and the subsequent running method of the vehicle 100 using the specified contact position of the vehicle 100 and the specified type of the abnormality.

Figure 21:
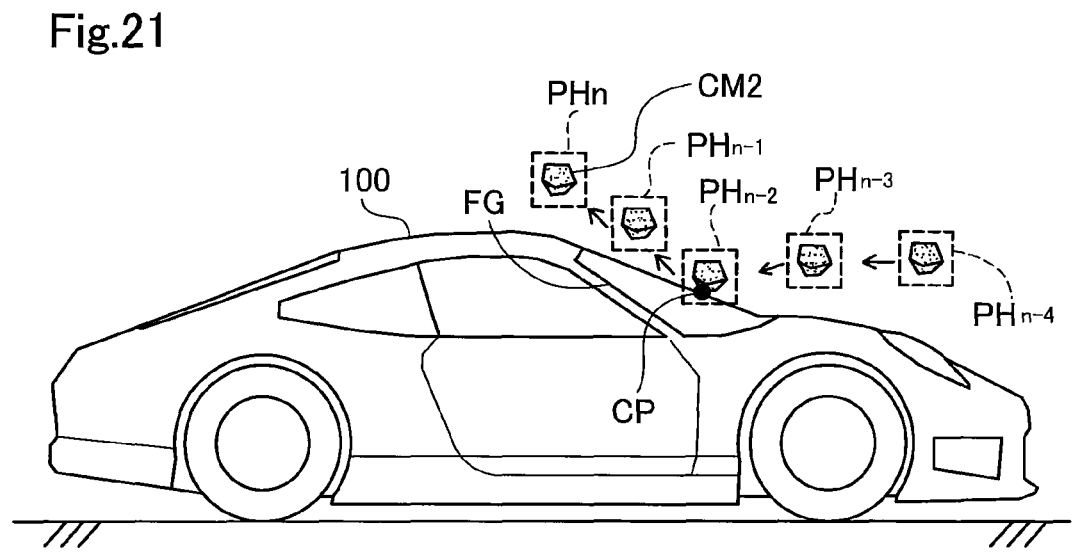

FIG. 21 is a first explanatory view of a method for specifying a contact position CP of the contact object CM with respect to the vehicle 100. When the contact object detection unit 314c detects a target object CM2, for example, by image analysis of the image PHn, the contact object detection unit 314c confirms whether or not the target object CM2 has come in contact with the vehicle 100. In the example of FIG. 21, image analysis is performed on the image PHn, as well as a plurality of images PHn−1, PHn−2, PHn−3, and PHn−4 captured by going back in time from the time of capturing the image PHn. The contact object detection unit 314c detects, for example, a change in the traveling direction of the target object CM2 around the vehicle 100 in the images PHn−1, PHn−2, and PHn−3, and specifies the target object CM2 as the contact object CM2. Further, using the image PHn−2 at the time point of the change in the traveling direction of the contact object CM2, the contact position CP where the vehicle 100 and the contact object CM2 came in contact with each other is specified. The contact position CP may also be derived from the intersection of the traveling direction of the contact object CM2 before the change and the traveling direction of the contact object CM2 after the change. In the example of FIG. 21, the contact position CP is present on a windshield FG of the vehicle 100. The contact object detection unit 314c may specify only the contact position CP, or may also specify the windshield FG as the part with which the contact object CM came in contact.

Figure 22:
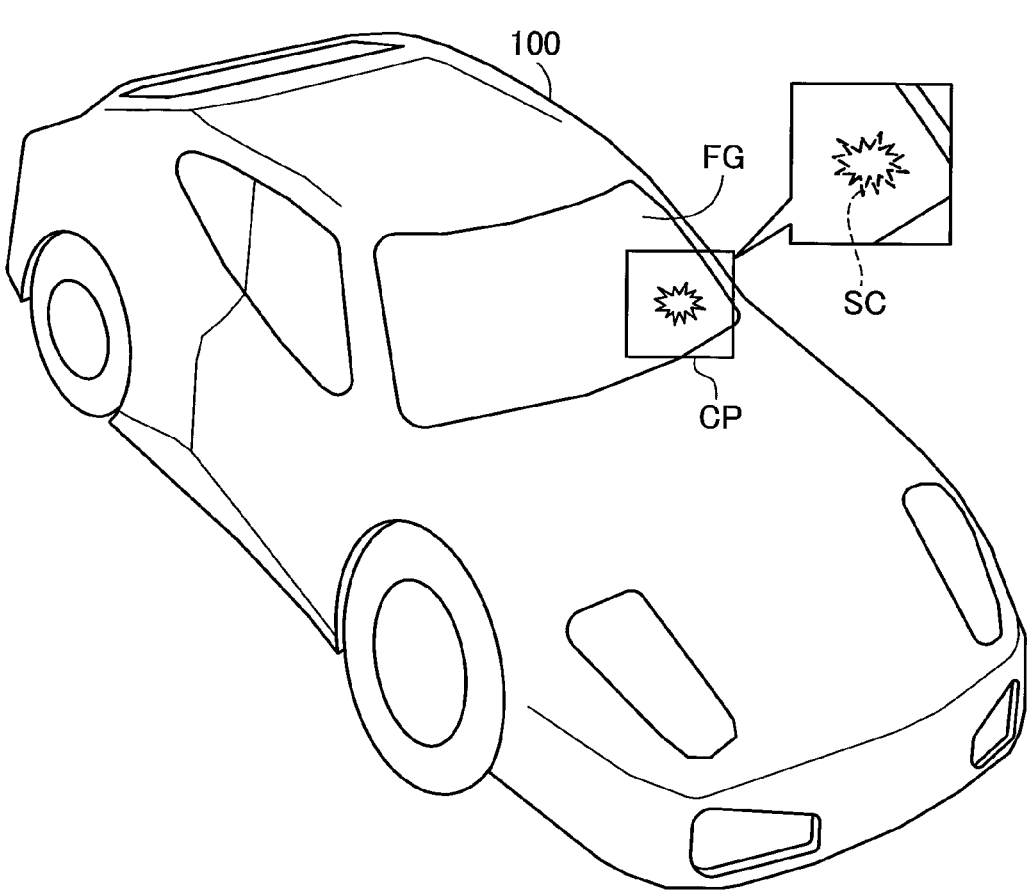
FIG. 22 is an explanatory view of a method for specifying the type of abnormality in a vehicle by a vehicle abnormality detection unit.

FIG. 22 is an explanatory view of a method for specifying the type of the abnormality of the vehicle 100 by the vehicle abnormality detection unit 318. As shown in FIG. 22, the vehicle abnormality detection unit 318 detects the presence or absence of abnormality in the vehicle 100 by analyzing the image of the specified contact position CP. The vehicle abnormality detection unit 318 specifies the type of the abnormality at the contact position CP using machine learning models, such as RNN, CNN, GAN, VAE, or the like, that have been trained in advance using images of the vehicle 100 showing abnormality or images of a normal vehicle 100, and object recognition using pattern matching using images showing abnormality. In the example of FIG. 22, the vehicle abnormality detection unit 318 specifies that the contact position CP of the contact object CM2 with respect to the vehicle 100 is the windshield FG, and that the type of the abnormality is a crack SC. In the case where the part of the vehicle 100 that has come in contact with the contact object CM2 has already been specified, the information of the contact part may be provided to the vehicle abnormality detection unit 318 to improve the accuracy of the detection of the type of abnormality by the vehicle abnormality detection unit 318 and to reduce the calculation cost of the vehicle abnormality detection unit 318.

Figure 23:
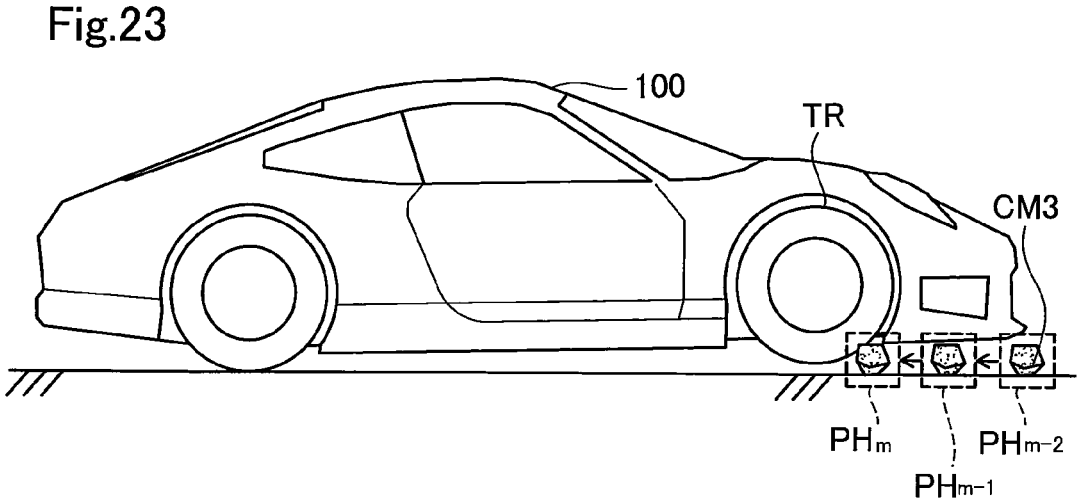
FIG. 23 is a second explanatory view of a method for specifying the contact position of a contact object with respect to a vehicle.

FIG. 23 is a second explanatory view of a method for specifying the contact position CP of the contact object CM with respect to the vehicle 100. As shown in FIG. 23, when the vehicle 100 which is running comes in contact with the target object CM3 which is staying still, the contact object detection unit 314c may also detect the target object CM3 as the contact object CM3. In this case, when the contact object detection unit 314c detects a target object CM3, for example, by image analysis of the image PHm–2, the contact object detection unit 314c confirms whether or not the target object CM3 has come in contact with the vehicle 100. In the example of FIG. 23, for example, the contact object detection unit 314c determines that the target object CM3 came in contact with the vehicle 100 at the time point of an image PHm where the occupation region in the image of the detected target object CM3 and the occupation region of the vehicle 100 overlap, and determines the target object CM3 as the contact object CM3.

The contact object detection unit 314c performs image analysis of the image PHm, as well as a plurality of images PHm–1, PHm–2, and the like, captured by going back in time from the time of capturing the image PHm. The contact object detection unit 314c specifies the contact position where the vehicle 100 and the contact object CM3 come in contact with each other, using, for example, the image PHm at the time point when the contact object CM3 comes in contact with a tire TR of the vehicle 100. The vehicle abnormality detection unit 318 performs image analysis of the contact position of the tire TR to specify the presence or absence of an abnormality as well as the type of the abnormality.

FIG. 24 is an explanatory view of an overview of the correspondence table 324e of the system 500 including the abnormality detection device according to the fifth embodiment. The correspondence table 324e defines the running method and the subsequent running method of the vehicle 100 corresponding to the type of the abnormality at the contact position CP of the contact object CM2. In the present embodiment, the running method determination unit 316 refers to the correspondence table 324e to determine the running method and the subsequent running method of the vehicle 100 corresponding to the type of the abnormality in the vehicle 100 specified by the vehicle abnormality detection unit 318. For example, in the case where the vehicle abnormality detection unit 318 specifies the type of the abnormality in the vehicle 100 as "a crack SC in the windshield FG" as shown in FIG. 22, the running method of the vehicle 100 is determined so that the vehicle 100 is stopped and the subsequent running method is determined so that the subsequent vehicle avoids the location where the contact object CM2 is generated. When the vehicle abnormality detection unit 318 specifies the type of the abnormality as "a scratch on a tire", the running method determination unit 316 does not change the running method and the subsequent running method. When the vehicle abnormality detection unit 318 specifies the type of the abnormality as "a dented bumper", the running method determination unit 316 determines the running method so that the vehicle 100 runs toward the repair process 40 and does not change the subsequent running method. When the vehicle abnormality detection unit 318 specifies the type of the abnormality as "falling of a bumper", the running method determination unit 316 stops the vehicle 100 and determines the subsequent running method to avoid the location where the contact with the contact object CM occurred.

As described above, the server 300e of the present embodiment includes the vehicle abnormality detection unit 318 that detects an abnormality of the vehicle 100. The contact object detection unit 314c specifies the contact position CP with the contact object CM2 in the vehicle 100. The vehicle abnormality detection unit 318 detects the presence or absence of abnormality in the vehicle 100 at the contact position CP and the type of the abnormality by analyzing the image of the specified contact position CP2.

Therefore, in addition to the presence or absence of the contact object CM2, it is possible to detect an abnormality in the vehicle 100 caused by the contact object CM2.

According to the server 300e of the present embodiment, the running method determination unit 316 determines the running method of the vehicle 100 using the information regarding the detected abnormality of the vehicle 100, the running method including whether or not the vehicle 100 is capable of running and the destination for which the vehicle 100 is to be headed. This allows determination of an appropriate running method for the vehicle 100 according to the abnormality that occurred in the vehicle 100.

F. Sixth Embodiment

Figure 25:
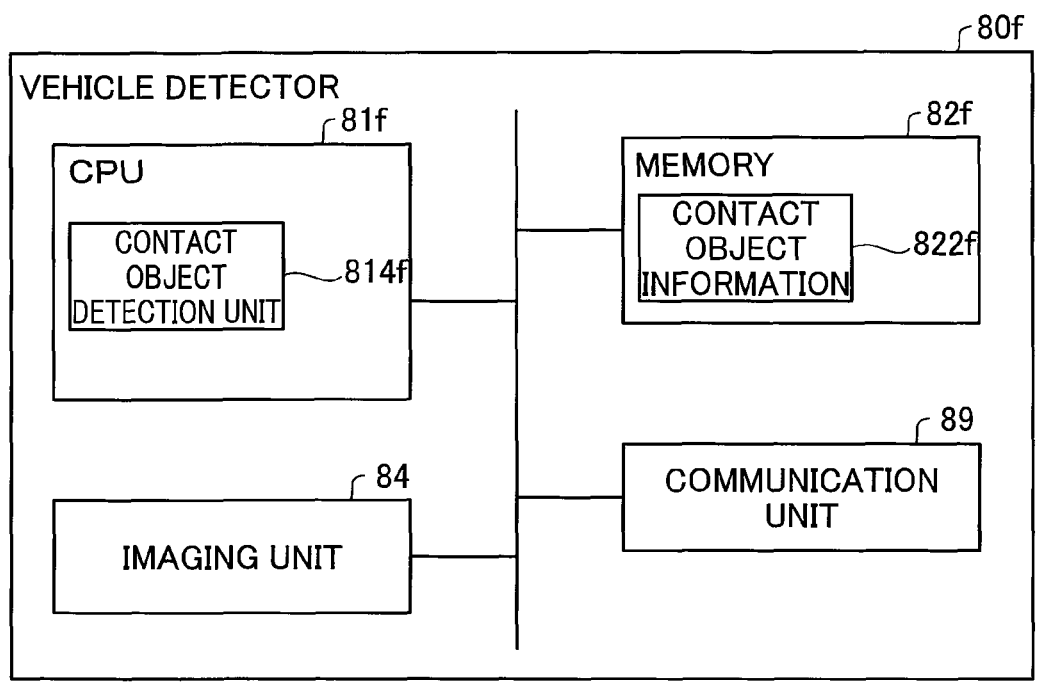
FIG. 25 is a block diagram of an internal functional structure of a camera according to a sixth embodiment.
Figure 26:
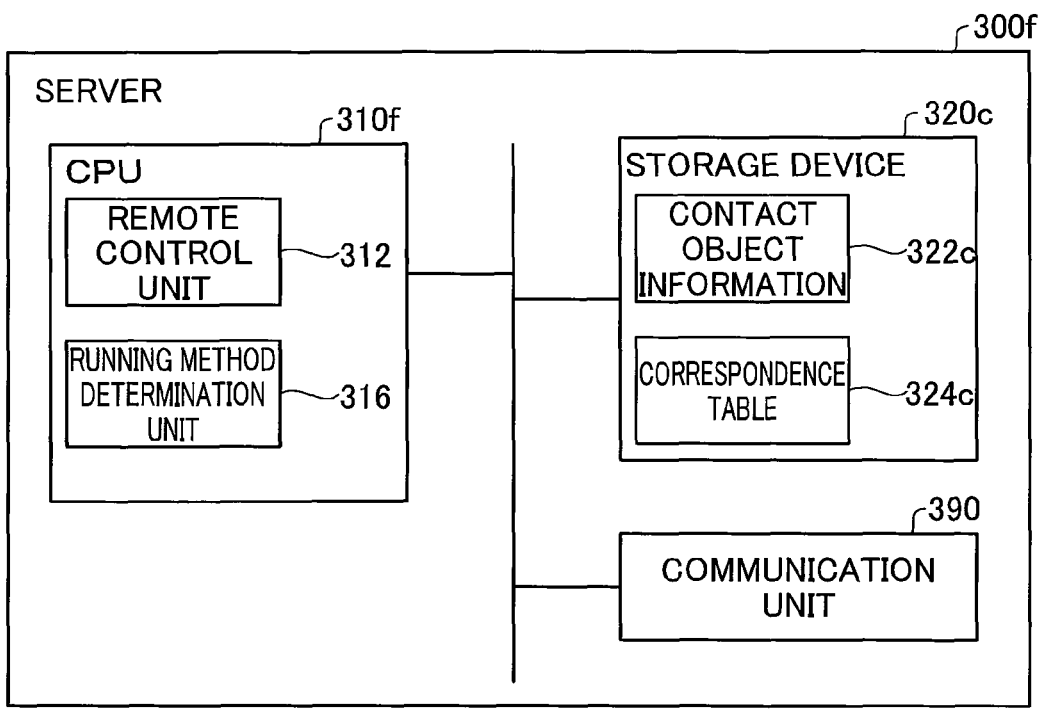
FIG. 26 is a block diagram of an internal functional structure of a server according to the sixth embodiment.

FIG. 25 is a block diagram of an internal functional structure of a camera 80f according to the sixth embodiment. FIG. 26 is a block diagram of an internal functional structure of a server 300f according to the sixth embodiment. The server 300f differs from the server 300c of the third embodiment shown in FIG. 14 in that the server 300f includes, instead of the CPU 310c, a CPU 310f that does not have the function of the contact object detection unit 314c, and is otherwise similar to the server 300c of the third embodiment in its configuration.

In the present embodiment, the camera 80f includes a CPU 81f as a central processing unit, a memory 82f such as ROM or RAM, an imaging unit 84, and a communication unit 89. These components are connected to one another via internal buses and interface circuits. The imaging unit 84 functions as a detection unit capable of detecting target objects around the vehicle 100. When the vehicle detector is not a camera but a device that detects the location of the vehicle 100 using a method other than images, for example, such as LiDAR, an emission unit that emits light or ultrasonic waves to detect the location of the vehicle 100, and a reception unit that receives reflected light or waves, etc. resulting from reflection of the emitted light or ultrasonic waves by the vehicle 100 function as the detection unit.

The contact object detection unit 814f has the same function as that of the contact object detection unit 314c shown in FIG. 14, and functions as an abnormality detection unit that performs image analysis of captured images acquired by the imaging unit 84 to detect the contact object CM that has come in contact with the vehicle 100. The results of the analysis by the contact object detection unit 814f are stored in the memory 82f as contact object information 822f similarly to the contact object information 322c shown in FIG. 14, and are also transmitted to the server 300 for use in the determination of the running method, or the like, by the running method determination unit 316. The camera 80f, together with the contact object detection unit 814f, may further include an abnormality detection unit having a function similar to that of the vehicle abnormality detection unit 318 shown in the third embodiment described above. In this case, the server 300f does not need to have the vehicle abnormality detection unit 318.

The camera 80f of the present embodiment includes the imaging unit 84 as a target object detection unit and a contact object detection unit 814f, the target object detection unit being capable of detecting an image of the vehicle 100 running in the factory FC and a target object CM around the vehicle 100, the contact object detection unit 814f analyzing the image of the target object CM captured by the imaging unit 84 to detect the contact object CM that has come in contact with the vehicle 100. Therefore, it is possible to detect the contact object CM that has come in contact with the vehicle 100 without newly providing a dedicated detector, thereby detecting the contact object CM with respect to the vehicle 100 while suppressing or preventing an increase in the number of parts in the factory FC.

G. Seventh Embodiment

Figure 27:
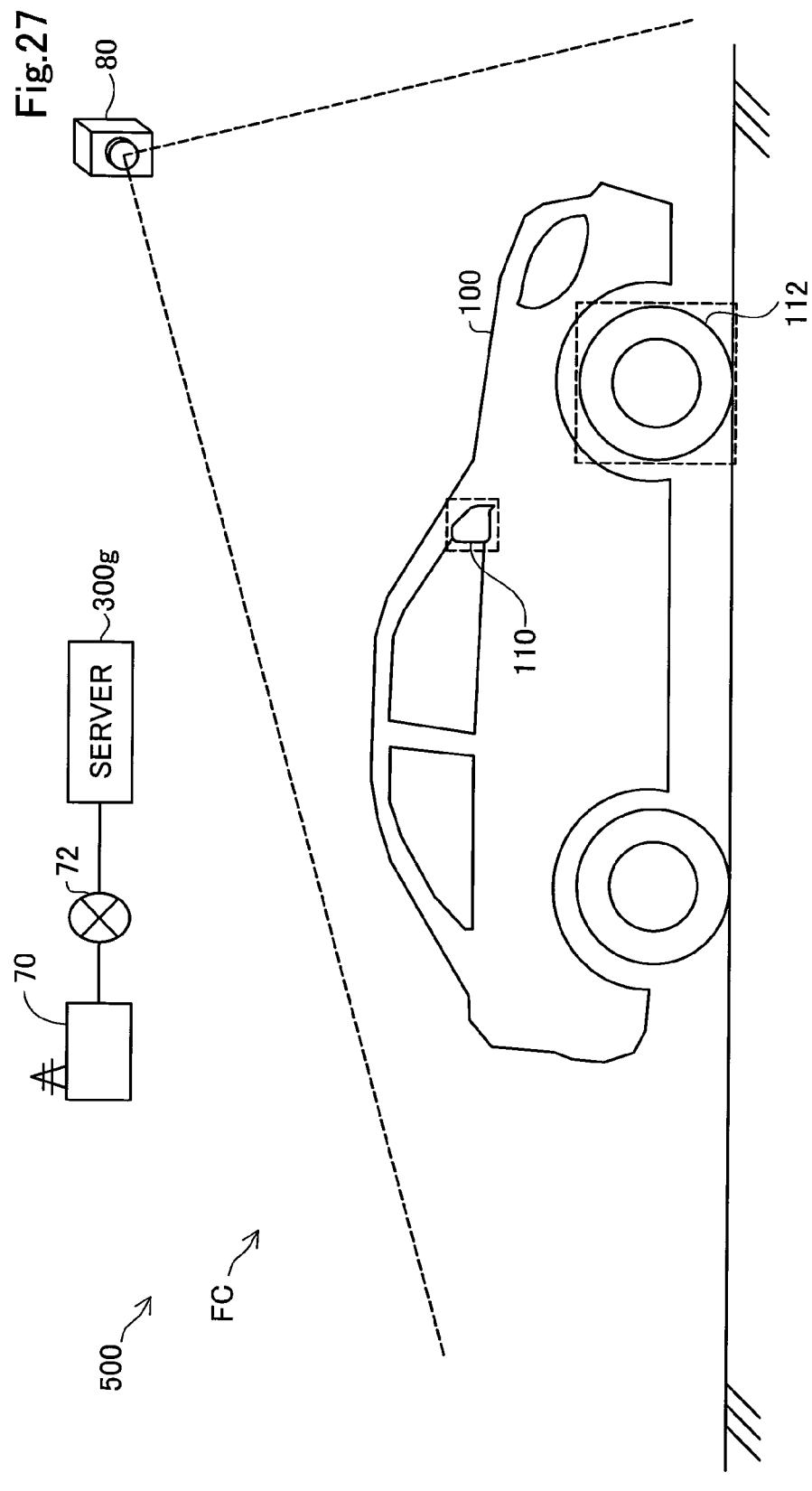
FIG. 27 is an explanatory view of a schematic structure of a system including an abnormality detection device of a seventh embodiment.

FIG. 27 is an explanatory view of a schematic structure of the system 500 including an abnormality detection device of the seventh embodiment. The system 500 differs from that of the first embodiment in that a server 300g of the seventh embodiment is provided instead of the server 300, and otherwise is similar to the first embodiment in its configuration.

In the present embodiment, the camera 80 also functions as a detection device capable of detecting target objects attached to the vehicle 100, in addition to vehicle information. The "target object attached to the vehicle 100" is, for example, vehicle parts attached to the vehicle 100, as well as jigs, tools, and instruments attached to the vehicle 100 during the manufacturing process of the vehicle 100. The "target object attached to the vehicle 100" may be a target object attached to the completed vehicle 100, or a target object attached during the manufacturing of the vehicle 100. The "target object attached to the vehicle 100" may be, for example, a target object that is temporarily attached to the vehicle 100 and is no longer attached when the vehicle 100 is completed, such as those attached only when the vehicle 100 is being manufactured. Further, the "target object attached to the vehicle 100" includes target objects fixed to the vehicle 100, and may also include target objects that are not fixed to the vehicle 100, for example, an unnecessary tool left in the vehicle 100 during manufacturing. The present embodiment is described using an example in which the target object attached to the vehicle 100 is a door mirror 110 and a wheel 112 shown in FIG. 27.

Figure 28:
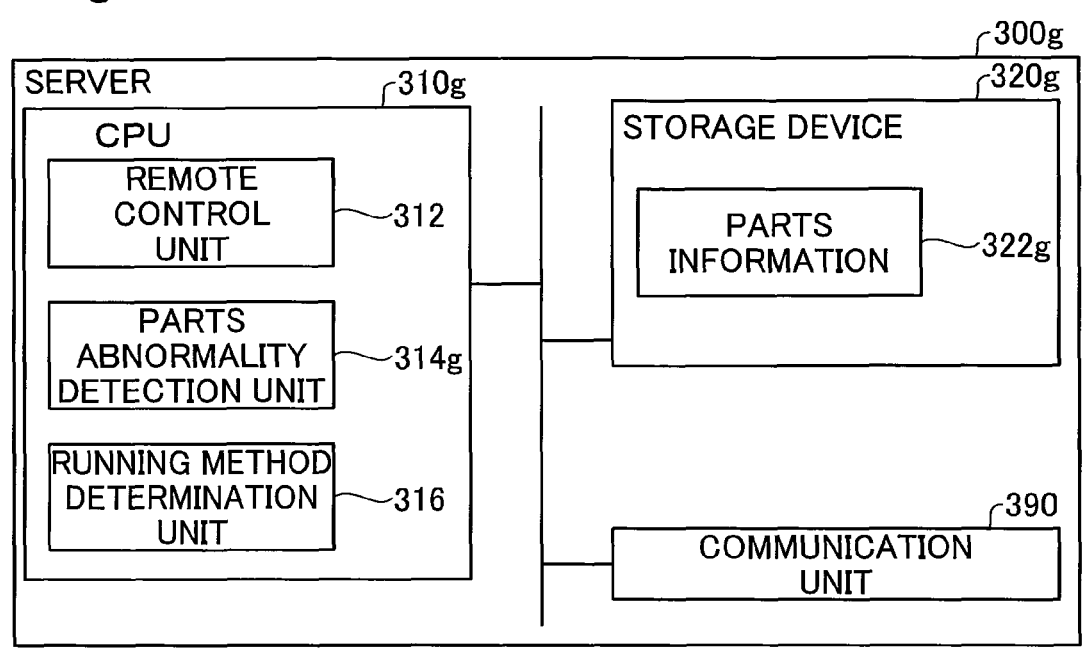
FIG. 28 is a block diagram of an internal functional structure of a server.

FIG. 28 is a block diagram of an internal functional structure of the server 300g. The server 300g differs from server 300 shown in the first embodiment in that the server 300g has a CPU 310g instead of the CPU 310 and a storage device 320g instead of the storage device 320, and otherwise is similar to the first embodiment in its configuration. The storage device 320g differs from the storage device 320 in that the storage device 320g stores parts information 322g instead of the foreign matter information 322 and that the storage device 320g does not store the first correspondence table 324 and the second correspondence table 326.

The parts information 322g defines the correspondence between the target object attached to the vehicle 100 and a predetermined attaching condition for the target object. The "attaching condition for target object" is a predetermined condition for determining whether or not the target object attached to the vehicle 100 is properly attached to the vehicle 100. The "attaching condition for target object" includes, for example, whether or not the attached target object matches the intended target object, the location at which the target object is to be attached, the shape and state of the attached target object, and the like. In the present embodiment, the parts information 322g stores attaching condition with respect to the vehicle 100, including the positions in which the door mirror 110 and the wheel 112 are attached, the model numbers and shapes of the door mirror 110 and the wheel 112, the state in which the door mirror 110 and the wheel 112 are fixed to the vehicle 100, and the like. The CPU 310g differs from the CPU 310 in that the CPU 310g functions as a parts abnormality detection unit 314g instead of the foreign matter detection unit 314. The parts abnormality detection unit 314g is an embodiment of the abnormality detection unit. The parts abnormality detection unit 314g performs image analysis of images of target objects attached to the vehicle 100 captured by the camera 80. When the target object attached to the vehicle 100 does not satisfy the target object attaching condition based on an analysis result of the image, the parts abnormality detection unit 314g detects such an improper attachment of the target object to the vehicle 100 as an abnormality. For example, when the model numbers and the shapes of the door mirror 110 and the wheel 112 detected by image analysis do not match the model numbers and the shapes in the parts information 322g, when the positions in which the door mirror 110 and the wheel 112 are attached do not match the attaching positions in the parts information 322g, or when vibration or oscillation of the door mirror 110 and the wheel 112 is detected, the parts abnormality detection unit 314g determines that the door mirror 110 and the wheel 112 are not properly attached to the vehicle 100 and detects it as an abnormality. The results of abnormality detection by the parts abnormality detection unit 314g are stored in the storage device 320g as parts information 322g.

The running method determination unit 316 determines the running method of the vehicle 100 using the information regarding the improper attachment of the target object detected by the parts abnormality detection unit 314g to the vehicle 100, the running method including whether or not the vehicle 100 is capable of running and the destination for which the vehicle 100 is to be headed. For example, in the case of improper attachment of the door mirror 110 and the wheel 112 or the like, the destination for which the vehicle 100 is to be headed is changed to a destination where the abnormality of the vehicle 100 can be solved, such as a repair process. The running method determination unit 316 may further determine a subsequent running method for the subsequent vehicle using the information regarding the improper attachment of the target object to the vehicle 100, the subsequent running method including whether or not the subsequent vehicle is capable of running and the subsequent running route where the subsequent vehicle runs. When a minor abnormality, such as an unnecessary tool being left in the vehicle 100, is detected, not the running method determination unit 316 but the parts abnormality detection unit 314g may report only the minor abnormality.

As described above, according to the server 300g of the present embodiment, when the analysis result obtained by analyzing the detection result of the target object attached to the vehicle 100 by the camera 80 does not satisfy the attaching condition for the target object attached to the vehicle 100, the parts abnormality detection unit 314g detects it as an abnormality. Therefore, it is possible to detect abnormalities, for example, in the target object attached to the vehicle 100, thereby suppressing or preventing a decrease in quality of the vehicle 100 as a product.

The server 300g of the present embodiment further includes the running method determination unit 316 that determines the running method using the information regarding the target object that is not properly attached, the running method including at least one of whether or not the vehicle 100 is capable of running and changes in the destination for which the vehicle 100 is to be headed. This allows determination of an appropriate running method for the vehicle 100 according to the abnormality in attaching the target object to the vehicle 100.

H. Eighth Embodiment

Figure 29:
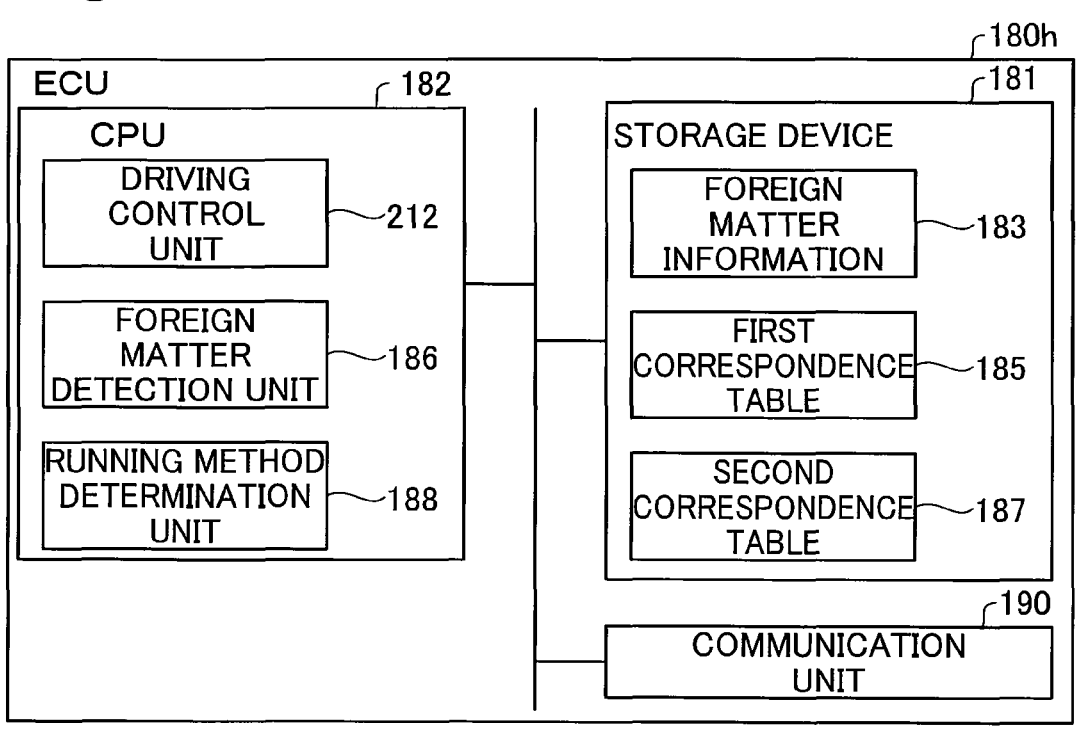
FIG. 29 is a block diagram of a functional structure of ECU of a vehicle according to an eighth embodiment.

FIG. 29 is a block diagram of a functional structure of an ECU 180h of the vehicle 100 according to the eighth embodiment. The present embodiment differs from the first embodiment in that the system 500 does not include the server 300. Specifically, the present embodiment differs from the first embodiment in that the ECU 180*h* provided in the vehicle 100 functions as an abnormality detection device, instead of the server 300. The rest of the configuration of the system 500 is the same as that in the first embodiment, unless otherwise specified.

As shown in FIG. 29, the ECU 180*h* includes a CPU 182 as a central processing unit, a storage device 181 such as ROM and RAM, and a communication unit 190 connected to an interface circuit (not shown). They are connected via an internal bus to enable bidirectional communication. The storage device 181 stores foreign matter information 183 that corresponds to the foreign matter information 322 stored in the storage device 320 of the server 300 shown in the first embodiment, and a first correspondence table 185 and a second correspondence table 187 that correspond to the first correspondence table 324 and the second correspondence table 326. Further, the storage device 181 further stores a program to implement functions corresponding to the foreign matter detection unit 314 and the running method determination unit 316 provided in the server 300 of the first embodiment. As a result, the CPU 182 functions as the foreign matter detection unit 186 and the running method determination unit 188 corresponding to these functions. According to the vehicle 100 thus configured, since the vehicle 100 has the function of the abnormality detection device, it is possible to detect abnormalities caused by target objects on the track RT of the vehicle 100 without using a device separated from the vehicle 100, such as the server 300, thereby suppressing or preventing the running of the vehicle 100 by unmanned driving from being interfered. As in the present embodiment, each of the above-mentioned configurations of the second to eighth embodiments may be constituted of the ECU 180*h* alone.

Figure 30:
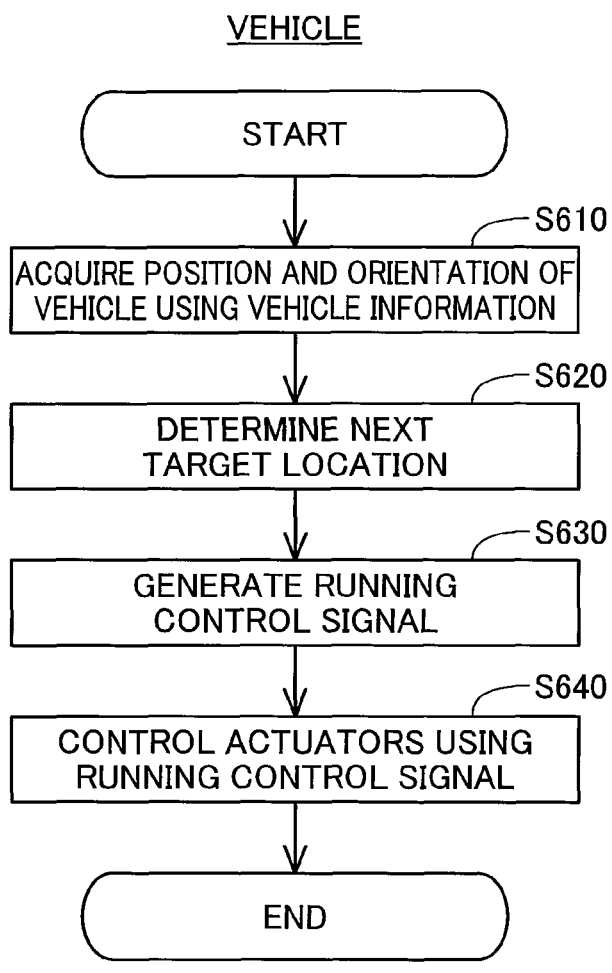
FIG. 30 is a flowchart of a vehicle running method of the eighth embodiment.

FIG. 30 is a flowchart of a running method of the vehicle 100 of the eighth embodiment. The driving control unit 212 acquires the position and the orientation of the vehicle 100 using the vehicle information output from the camera 80 (step S610). The driving control unit 212 determines the target location to which the vehicle 100 is supposed to go next (step S620). In the present embodiment, the reference route is stored in advance in the storage device 181 of the ECU 180*h*. The driving control unit 212 generates a running control signal to make the vehicle 100 run toward the determined target location (step S630). The driving control unit 212 controls the actuators using the generated running control signal, thereby driving the vehicle 100 at the acceleration and the steering angle indicated by the running control signal (step S640). The driving control unit 212 repeats the acquisition of the position and the orientation of the vehicle 100, the determination of the target location, the generation of the running control signal, and the control of the actuators, in a predetermined cycle. According to the vehicle 100 of the present embodiment, it is possible to make the vehicle 100 run by autonomous control without remote control of the vehicle 100 by the server 300.

I. Alternative Embodiments (I1) The first embodiment described above shows an example in which the server 300 includes the foreign matter detection unit 314 and the running method determination unit 316. In contrast, all or part of the functions of the foreign matter detection unit 314 and the running method determination unit 316 may be provided in a device other than the server 300, such as the vehicle 100 or the camera 80.

(I2) Although the above embodiments show only the example in which the server 300 includes the running method determination unit 316, the server 300 may be configured without the running method determination unit 316. According to this embodiment of the server 300, the foreign matter FM on the track RT may be detected while suppressing an increase in the number of parts.

(I3) The first embodiment described above shows the example in which the foreign matter detection unit 314 determines whether the detected foreign matter is a liquid or not, and whether the detected foreign matter is a vehicle part or not. In contrast, the foreign matter detection unit 314 may only determine whether the detected foreign matter is a liquid or not, or only determine whether the detected foreign matter is a vehicle part or not. Further, the foreign matter detection unit 314 may only detect foreign matters without determining whether the detected foreign matter is a liquid or not, and whether the detected foreign matter is a vehicle part or not. The foreign matter detection unit 314 is not limited to determining only whether the foreign matter is a liquid or not, but may also determine whether the foreign matter is in a state other than a liquid, such as a gas, solid, gel, or the like. The foreign matter detection unit 314 is not limited to determining only whether the foreign matter is a vehicle part or not, but may also determine whether or not the foreign matter is one of various items used in the factory FC, such as a tool used in the factory, paper such as an instruction, or the like, or one of various items used outside the factory FC. The foreign matter detection unit 314 may also determine various characteristics, such as the size, shape, temperature, color, and the like, of the foreign matter. Further, the foreign matter detection unit 314 may also detect target objects that do not affect the running of the vehicle 100.

(I4) The first embodiment described above shows an example in which the running method determination unit 316 determines the running method of the vehicle 100 using the type of the liquid and the type of the vehicle part specified by the foreign matter detection unit 314. In contrast, the running method determination unit 316 may determine the running method of the vehicle 100 using only either the type of the liquid or the type of the vehicle part. Further, the running method determination unit 316 may also determine the subsequent running method of the vehicle 100 using items other than the type of the liquid and the type of the vehicle part detected by the foreign matter detection unit 314.

(I5) The first embodiment described above shows an example in which, when the detected foreign matter is a liquid, the foreign matter detection unit 314 determines whether the amount of the liquid is equal to or more than the first threshold or equal to or more than the third threshold. In contrast, the foreign matter detection unit 314 may only determine whether the detected foreign matter is a liquid or not, without determining the degree of amount of the liquid. Further, the first embodiment described above shows an example in which, when the detected foreign matter is a vehicle part, the foreign matter detection unit 314 determines whether or not the volume or number of the vehicle parts is equal to or more than the second threshold or equal to or more than the fourth threshold. In contrast, the foreign matter detection unit 314 may only determine whether the detected foreign matter is a vehicle part or not, without determining the degree of volume or number of the vehicle parts.

(I6) The first embodiment described above shows an example in which the running method determination unit 316 determines, as a running method for the vehicle 100, a running method including both whether or not the vehicle 100 is capable of running and a running route where the vehicle 100 runs, using the information regarding the detected foreign matter FM. In contrast, the running method determination unit 316 may determine, as the running method for the vehicle 100, only one of whether or not the vehicle 100 is capable of running and the running route of the vehicle 100.

(I7) The first embodiment described above shows an example in which the running method determination unit 316 determines a subsequent running method including both whether or not the subsequent vehicle is capable of running and a subsequent running route where the subsequent vehicle runs. In contrast, the running method determination unit 316 may also be configured not to determine the subsequent running method. Further, the running method determination unit 316 may determine, as the subsequent running method, only one of whether or not the subsequent vehicle is capable of running and the subsequent running route of the subsequent vehicle.

(I8) The first embodiment described above shows an example in which the running method determination unit 316 determines the subsequent running method using the type of the liquid and the type of the vehicle part specified by the foreign matter detection unit 314. In contrast, the running method determination unit 316 may determine the subsequent running method using only either the type of the liquid or the type of the vehicle part. Further, the running method determination unit 316 may also determine the subsequent running method using items other than the type of the liquid and the type of the vehicle part detected by the foreign matter detection unit 314.

(I9) The first embodiment described above shows an example in which the foreign matter detection unit 314 acquires captured images by the camera 80 and analyzes the acquired captured images to acquire the position and orientation of the vehicle 100 as well as detection of foreign matter and information regarding the foreign matter. In contrast, in the case where the vehicle detector is not the camera 80, the detection of foreign matter and information regarding the foreign matter may be acquired by analyzing the detection results acquired by a vehicle detector other than the camera 80. For example, when the vehicle detector is a LiDAR, the detection of foreign matter and information regarding the foreign matter may be acquired by analyzing the 3D point cloud data acquired by the LiDAR. The "3D point cloud data" is data indicating the 3D position of a point cloud. The vehicle detector measures the 3D point cloud data of the vehicle 100 as vehicle information. Further, the camera 80 may be used with a vehicle detector other than the camera 80. In this case, the detection of foreign matters can be performed from multiple angles by a plurality of types of vehicle detectors, thereby improving the accuracy of foreign matter detection.

(I10) The first embodiment described above shows an example in which the foreign matter detection unit 314 extracts the detection position of the foreign matter and the detection timing thereof, thereby determining whether or not the foreign matter is an item installed in the vehicle. In contrast, the detection position of the foreign matter and the detection timing thereof may not be extracted, and the determination as to whether or not the extracted foreign matter is an item installed in the vehicle 100 may not be performed.

(I11) The first embodiment described above shows an example in which, when it is determined that the foreign matter is an item having been installed in the vehicle 100, the running method determination unit 316 changes the running route of the vehicle 100 to a running route in which the vehicle 100 is to be headed for the repair process. In contrast, the vehicle 100 may be made to run to the repair process regardless of whether or not the foreign matter is an item having been installed in the vehicle 100. Further, it is also possible to perform a process other than the process of causing the vehicle 100 to run to the repair process, such as a process of stopping the vehicle 100, when the foreign matter is an item having been installed in the vehicle 100. In this case, it is preferable to give a notification to prompt repair of the vehicle 100 to workers.

(I12) The third embodiment described above shows an example in which the contact object detection unit 314c, the running method determination unit 316, and the vehicle abnormality detection unit 318 are provided in the server 300. In contrast, all or part of the functions of the contact object detection unit 314c, the running method determination unit 316, and the vehicle abnormality detection unit 318 may be provided in a device other than the server 300, such as the vehicle 100 or the camera 80.

(I13) The third to fifth embodiments described above show an example in which the server 300 includes the running method determination unit 316; however, in the case where the running method of the vehicle 100 is not determined, the server 300 may be configured without the running method determination unit 316. Even with this embodiment of the server 300, it is possible to detect the contact object CM with respect to the vehicle 100, while suppressing an increase in the number of parts.

(I14) The third to fifth embodiments described above show examples in which the running method determination unit 316 determines, as a running method for the vehicle 100, a running method including both whether or not the vehicle 100 is capable of running and a running route where the vehicle 100 runs, using the information regarding the detected contact object CM. In contrast, the running method determination unit 316 may determine, as the running method for the vehicle 100, only one of whether or not the vehicle 100 is capable of running and the running route of the vehicle 100.

(I15) The third to fifth embodiments described above show examples in which the running method determination unit 316 determines a subsequent running method including both whether or not the subsequent vehicle is capable of running and a subsequent running route where the subsequent vehicle runs. In contrast, the running method determination unit 316 may also be configured not to determine the subsequent running method. Further, the running method determination unit 316 may determine, as the subsequent running method, only one of whether or not the subsequent vehicle is capable of running and the subsequent running route of the subsequent vehicle.

(I16) The third embodiment described above shows an example in which the contact object detection unit 314c identifies the type of the contact object CM, the fourth embodiment described above shows an example in which the contact object detection unit 314c acquires the speed and the volume of the contact object CM, and the fifth embodiment described above shows an example in which the contact object detection unit 314c specifies the contact position CP of the contact object CM. In contrast, the contact object detection unit 314c may specify all of the type of the contact object CM, the speed of the contact object CM, the volume of the contact object CM, and the contact position CP of the contact object CM, or any combination of these.

(I17) The third embodiment described above shows an example in which the running method determination unit 316 determines the running method of the vehicle 100 using the type of the contact object CM identified by the contact object detection unit 314c. In contrast, the contact object detection unit 314c may detect only the presence or absence of the contact object CM. In this case, the running method determination unit 316 may determine the running method of the vehicle 100 according to the result of the presence or absence of the contact object CM.

(I18) The fifth embodiment described above shows an example in which the vehicle abnormality detection unit 318 analyzes the contact position CP specified by the contact object detection unit 314c, thereby detecting an abnormality of the vehicle 100 at the contact position CP. In contrast, the contact object detection unit 314c may detect only the presence or absence of the contact object CM without specifying the contact position CP. In this case, the vehicle abnormality detection unit 318 detects an abnormality of the vehicle 100 by, for example, a method of performing image analysis of the entire vehicle 100, in response to the detection of the contact object CM.

(I19) The third embodiment described above shows an example in which the running method determination unit 316 gives a notification of the contact between the contact object CM and the vehicle 100 and also a notification to require removal of the contact object CM from the track RT In contrast, the running method determination unit 316 may not perform the notification when, for example, the contact object CM is removed upon the detection of the contact object CM.

(I20) The third embodiment described above shows an example in which the contact object detection unit 314c acquires captured images by the camera 80 and analyzes the acquired captured images to acquire the position and orientation of the vehicle 100 as well as detection of foreign matter and information regarding the foreign matter. In contrast, in the case where the vehicle detector is not the camera 80, the detection of foreign matter and information regarding the foreign matter may be acquired by analyzing the detection results acquired by a vehicle detector other than the camera 80. For example, when the contact object detection unit 314c is a LiDAR, the detection of foreign matter and information regarding the foreign matter may be acquired by analyzing the point cloud data acquired by the LiDAR. Further, the camera 80 may be used with a vehicle detector other than the camera 80. In this case, the detection of foreign matters can be performed from multiple angles by a plurality of types of vehicle detectors, thereby improving the accuracy of foreign matter detection.

(I21) The first embodiment described above shows an example in which the vehicle 100 is a passenger car, a truck, a bus, a construction vehicle, or the like. However, the vehicle 100 may be a variety of moving objects. The "moving object" is a movable object, which is, for example, a vehicle or an electric vertical takeoff and landing aircraft (so-called a "flying car"). The vehicle may be a vehicle that runs by wheels or a vehicle that runs by a caterpillar track, and may be, for example, a two-wheeled vehicle, a four-wheeled vehicle, a tank, or the like. Examples of the vehicle include battery electric vehicles (BEV), gasoline-powered vehicles, hybrid vehicles, and fuel cell vehicles. In the case where the moving object is not a vehicle, the expressions "vehicle" and "car" in the present disclosure may be replaced with "moving object" as appropriate, and the expression "running" may be replaced with "moving" as appropriate.

(I22) It is sufficient that the vehicle 100 is configured to be movable by unmanned driving. For example, the vehicle 100 may be in the form of a platform with the configuration described below. Specifically, it is sufficient that the vehicle 100 is equipped with at least an ECU 180, a driving device, a steering device, and a braking device, in order to perform the three functions: "running", "turning", and "stopping", through unmanned driving. When the vehicle 100 acquires information from outside to enable unmanned driving, the vehicle 100 may further be equipped with the communication unit 190. That is, the vehicle 100 movable by unmanned driving may not be equipped with at least some of the interior components such as a driver's seat and dashboard, at least some of the exterior components such as bumpers and fenders, or a body shell. In this case, the remaining parts such as the body shell may be installed in the vehicle 100 before the vehicle 100 is shipped from the factory, or the remaining parts such as the body shell may be installed in the vehicle 100 after the vehicle 100 in which the remaining parts such as the body shell are not installed is shipped from the factory. These parts may be installed in the vehicle 100 from any direction, such as the top, bottom, front, rear, right or left side of the vehicle 100, and may be installed from the same direction or from different directions. The location determination can be made also for this platform embodiment in the same manner as for the vehicle 100 in the first embodiment.

(I23) The vehicle 100 may be manufactured by any manufacturing method. For example, the vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(I24) The first embodiment described above shows an example in which the server 300 performs the process from the acquisition of the position and orientation of the vehicle 100 to the generation of the running control signals. In contrast, the vehicle 100 may perform at least a part of the process from the acquisition of the position and orientation of the vehicle 100 to the generation of the running control signals. For example, the embodiments (1) to (3) below may be applied.

(1) The server 300 may acquire the position and orientation of the vehicle 100, determine the target location to which the vehicle 100 is supposed to go next, and generate a route from the current location of the vehicle 100 shown by the acquired position to the target location. The server 300 may generate a route to a target location between the current location and the destination, or may generate a route to the destination. The server 300 may transmit the generated route to the vehicle 100. The vehicle 100 may generate a running control signal so that the vehicle 100 runs on the route received from the server 300 and control the actuators using the generated running control signal.

(2) The server 300 may acquire the position and orientation of the vehicle 100 and transmit the acquired position and orientation to the vehicle 100. The vehicle 100 may determine the target location to which the vehicle 100 is supposed to go next, generate a route from the current location of the vehicle 100 shown by the received location to the target location, generate a running control signal so that the vehicle 100 runs on the generated route, and control actuators using the generated running control signal.

(3) In the embodiments (1) and (2) above, the vehicle 100 may be equipped with an internal sensor, and detection results output from the internal sensor may be used for at least one of the generation of the route and the generation of the running control signal. Examples of the internal sensor may include, for example, camera, LiDAR, millimeter wave radar, ultrasonic sensor, GPS sensor, acceleration sensor, gyro sensor, and the like. For example, in the embodiment (1) described above, the server 300 may acquire the detection result of the internal sensor, and reflect the detection result of the internal sensor to the route when the route is generated. In the embodiment (1) described above, the vehicle 100 may acquire the detection result of the internal sensor, and reflect the detection result of the internal sensor to the running control signal when the running control signal is generated. In the embodiment (2) described above, the vehicle 100 may acquire the detection result of the internal sensor, and reflect the detection result of the internal sensor to the route when the route is generated. In the embodiment (2) described above, the vehicle 100 may acquire the detection result of the internal sensor, and reflect the detection result of the internal sensor to the running control signal when the running control signal is generated.

(I25) In the eighth embodiment described above, the vehicle 100 may be equipped with an internal sensor, and detection results output from the internal sensor may be used for at least one of the generation of the route and the generation of the running control signal. For example, the vehicle 100 may acquire the detection result of the internal sensor, and reflect the detection result of the internal sensor to the route when the route is generated. The vehicle 100 may acquire the detection result of the internal sensor, and reflect the detection result of the internal sensor to the running control signal when the running control signal is generated.

(I26) In the eighth embodiment described above, the vehicle 100 acquires the position and orientation of the vehicle 100 using the detection result of the camera 80.

In contrast, the vehicle 100 may be equipped with an internal sensor, and the vehicle 100 may acquire the position and the orientation using the detection result of the internal sensor, determine the target location to which the vehicle

100 is supposed to go next, generate a route from the current location of the vehicle 100 shown by the acquired position and orientation to the target location, generate a running control signal for running on the generated route, and control the actuators using the generated running control signal. In this case, the vehicle 100 is allowed to run without using any detection results of the camera 80. The vehicle 100 may acquire target arrival time and traffic jam information from outside of the vehicle 100, and may reflect the target arrival time and the traffic jam information to at least one of the route and the running control signal. Further, all of the configuration of the system 500 and the functional structure of the server 300 may be provided in the vehicle 100. In other words, the processes implemented by the system 500 and the server 300 shown in the present disclosure, such as the process of switching at least one of the devices provided in the vehicle 100 from a standby state to an operational state, may be implemented by the vehicle 100 alone.

(I27) In the first embodiment described above, the server 300 automatically generates the running control signal which is transmitted to the vehicle 100. In contrast, the server 300 may generate the running control signal to be transmitted to the vehicle 100 according to the operation of an operator located outside the vehicle 100. For example, the operator may operate an operating device equipped with a display for displaying images output from the camera 80, a steering wheel, an accelerator pedal, and a brake pedal for enabling remote control of the vehicle 100, and a communication device for enabling communication with the server 300 via wired or wireless communication, and the server 300 may generate the running control signal in response to the operation made on the operating device.

(I28) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be implemented by a dedicated computer that is provided by configuring a memory and a processor programmed to perform one or more functions embodied by a computer program. Alternatively, the control unit and the method thereof described in the present disclosure may be implemented by a dedicated computer that is provided by configuring a processor with one or more dedicated hardware logic circuits. Otherwise, the control unit and the method thereof described in the present disclosure may be implemented by one or more dedicated computers that are configured by combining a memory and a processor programmed to perform one or more functions with a processor configured with one or more hardware logic circuits. Further, the computer program may be stored in a non-transitory tangible computer readable storage medium, as instructions to be executed by a computer.

The present disclosure is not limited to the embodiments described above, but can be realized in various configurations without departing from the spirit thereof. For example, the technical features of the embodiments corresponding to the technical features in each of the aspects stated in the Summary section may be replaced or combined as appropriate to solve some or all of the problems described above or to achieve some or all of the effects described above.

Further, if the technical feature is not described as essential in this specification, the technical feature may be deleted as appropriate.

What is claimed is:

1. An abnormality detection device, comprising:

a storage that stores a program; and a processor configured to execute the program, wherein the processor executes the program to:

detect an abnormality by analyzing a result of detection of at least one of a target object on a track of a vehicle, a target object around the vehicle, and a target object attached to the vehicle, the vehicle being capable of running by unmanned driving, the result of detection being by a detection device that is capable of detecting the at least one target object; and output, when the abnormality is detected, a signal that is different from a signal output when the abnormality is not detected, wherein the detection device detects the target object on the track, and when an analysis result from the result of detection of the target object on the track by the detection device satisfies a predetermined condition for determining that the target object on the track is a foreign matter, the processor is configured to detect the foreign matter on the track as the abnormality.

2. The abnormality detection device according to claim 1, wherein the detection device further detects either an image of the vehicle or 3D point cloud data of the vehicle, in addition to the at least one target object.

3. The abnormality detection device according to claim 1, wherein the processor is further configured to determine a running method including at least one of whether or not the vehicle is capable of running and a change of a destination for which the vehicle is to be headed, using information regarding the detected foreign matter on the track.

4. The abnormality detection device according to claim 3, wherein the processor is further configured to:

analyze the result of detection by the detection device to further determine whether the detected foreign matter on the track is a liquid or not, and further specify a type of the liquid when the foreign matter on the track is the liquid, and determine the running method using the specified type of the liquid.

5. The abnormality detection device according to claim 3, wherein the processor is further configured to:

analyze the result of detection by the detection device to further determine whether the detected foreign matter on the track is a liquid or not, and further determine whether or not an amount of the liquid is equal to or more than a predetermined first threshold when the foreign matter on the track is the liquid, and stop the vehicle when the amount of the liquid is equal to or more than the predetermined first threshold, and change the destination to a repair process when the amount of the liquid is less than the predetermined first threshold.

6. The abnormality detection device according to claim 3, wherein the processor is further configured to:

analyze the result of detection by the detection device to further determine whether the detected foreign matter on the track is a vehicle part of the vehicle or not, and further specify a type of the vehicle part when the foreign matter on the track is determined to be the vehicle part, and determine the running method using the specified type of the vehicle part.

7. The abnormality detection device according to claim 3, wherein the processor is further configured to:

analyze the result of detection by the detection device to further determine whether the detected foreign matter on the track is a vehicle part of the vehicle or not, and further determine whether or not a volume or a number of the vehicle part is equal to or more than a predetermined second threshold when the foreign matter on the track is determined to be the vehicle part, and determine to stop the vehicle when the volume or the number of the vehicle part is equal to or more than the predetermined second threshold, and change the destination to a repair process when the volume or the number of the vehicle part is less than the predetermined second threshold.

8. The abnormality detection device according to claim 3, wherein the processor is further configured to determine a subsequent running method using information regarding the detected foreign matter on the track, the subsequent running method including at least one of whether or not a subsequent vehicle is capable of running, and a subsequent running route where the subsequent vehicle runs, the subsequent vehicle running after the foreign matter on the track is detected.

9. The abnormality detection device according to claim 8, wherein the processor is further configured to:

analyze the result of detection by the detection device to further determine whether the detected foreign matter on the track is a liquid or not, and further specifies a type of the liquid when the foreign matter on the track is the liquid, and determine the subsequent running method using the specified type of the liquid.

10. The abnormality detection device according to claim 8, wherein the processor is further configured to:

analyze the result of detection by the detection device to further determine whether the detected foreign matter on the track is a liquid or not, and determine whether or not an amount of the liquid is equal to or more than a predetermined third threshold when the foreign matter on the track is the liquid, and determine to stop the subsequent vehicle when the amount of the liquid is equal to or more than the predetermined third threshold, and change the subsequent running route to a subsequent running route where contact between the subsequent vehicle and the liquid is avoided when the amount of the liquid is less than the predetermined third threshold.

11. The abnormality detection device according to claim 8, wherein the processor is further configured to:

analyze the result of detection by the detection device to further determine whether the detected foreign matter on the track is a vehicle part or not, and specify a type of the vehicle part when the foreign matter on the track is determined to be the vehicle part, and determine the subsequent running method using the specified type of the vehicle part.

12. The abnormality detection device according to claim 8, wherein the processor is further configured to:

analyze the result of detection by the detection device to further determine whether the detected foreign matter on the track is a vehicle part or not, and determine whether or not a volume or a number of the vehicle part is equal to or more than a predetermined fourth threshold when the foreign matter on the track is determined to be the vehicle part, and determine to stop the subsequent vehicle when the volume or the number of the vehicle part is equal to or more than the predetermined fourth threshold, and change a running route of the subsequent vehicle to a subsequent running route where contact between the subsequent vehicle and the vehicle part is avoided when the volume or the number of the vehicle part is less than the predetermined fourth threshold.

13. The abnormality detection device according to claim 3, wherein the processor is further configured to analyze the result of detection by the detection device to further extract a detection position and a detection timing of the foreign matter on the track, and determine whether or not the foreign matter on the track is an item having been installed in the vehicle using the extracted detection position and detection timing.

14. The abnormality detection device according to claim 13, wherein, when the foreign matter on the track is determined to be an item installed in the vehicle, the processor is further configured to change the destination to a repair process.

15. The abnormality detection device according to claim 1, wherein the detection device detects the target object around the vehicle, and the processor is further configured to analyze a result of detection of the target object around the vehicle by the detection device, and, when a predetermined condition for determining that the target object around the vehicle is a contact object that has come in contact with the vehicle is satisfied, detect the contact object as the abnormality.

16. The abnormality detection device according to claim 15, wherein the processor is further configured to determine a running method including at least one of whether or not the vehicle is capable of running and a destination for which the vehicle is to be headed using information regarding the detected contact object.

17. The abnormality detection device according to claim 16, wherein the processor is further configured to:

analyze the result of detection by the detection device to further identify a type of the detected contact object, and determine the running method using the identified type of the contact object.

18. A detection device, comprising:

a detection unit that detects at least one of a target object on a track of a vehicle, a target object around the vehicle, and a target object attached to the vehicle, the vehicle being capable of running by unmanned driving;;

a storage that stores a program; and a processor configured to execute the program, wherein the processor executes the program to:

detect an abnormality by analyzing a result of detection of the detected at least one target object; and output, when the abnormality is detected, a signal that is different from a signal output when the abnormality is not detected, wherein when an analysis result from the result of detection of the target object on the track by the detection unit satisfies a predetermined condition for determining that the target object on the track is a foreign matter, the processor is configured to detect the foreign matter on the track as the abnormality.

19. A vehicle capable of running by unmanned driving, comprising:

a storage that stores a program; and a processor configured to execute the program, wherein the processor executes the program to:

detect an abnormality by analyzing a result of detection of at least one of a target object on a track of the vehicle, a target object around the vehicle, and a target object attached to the vehicle by a detection device that is capable of detecting the at least one target object; and perform, when the abnormality is detected, running that is different from running when the abnormality is not detected, wherein the detection device detects the target object on the track, and when an analysis result from the result of detection of the target object on the track by the detection device satisfies a predetermined condition for determining that the target object on the track is a foreign matter, the processor is configured to detect the foreign matter on the track as the abnormality.

* * * * *